US009817396B1

(12) United States Patent
Takayama et al.

(10) Patent No.: US 9,817,396 B1
(45) Date of Patent: Nov. 14, 2017

(54) SUPERVISORY CONTROL OF AN UNMANNED AERIAL VEHICLE

(71) Applicant: X Development LLC, Mountain View, CA (US)

(72) Inventors: Leila Takayama, Mountain View, CA (US); Brandon Alexander, San Francisco, CA (US); Roger William Graves, San Francisco, CA (US); Justin Sadowski, San Francisco, CA (US); Abraham Bachrach, Berkeley, CA (US)

(73) Assignee: X Development LLC, Mountain View, CA (US)

( * ) Notice: Subject to any disclaimer, the term of this patent is extended or adjusted under 35 U.S.C. 154(b) by 246 days.

(21) Appl. No.: 14/587,091

(22) Filed: Dec. 31, 2014

Related U.S. Application Data

(60) Provisional application No. 62/009,634, filed on Jun. 9, 2014.

(51) Int. Cl.
| G05D 1/02 | (2006.01) |
| G05D 1/12 | (2006.01) |
| B64C 39/02 | (2006.01) |
| G05D 1/00 | (2006.01) |
| G08G 5/00 | (2006.01) |
| B64C 27/00 | (2006.01) |

(52) U.S. Cl.
CPC ......... *G05D 1/0088* (2013.01); *B64C 39/024* (2013.01); *G05D 1/0094* (2013.01); *G05D 1/0202* (2013.01); *G08G 5/0069* (2013.01); *B64C 27/00* (2013.01); *B64C 2201/128* (2013.01); *B64C 2201/141* (2013.01); *B64C 2201/146* (2013.01)

(58) Field of Classification Search
CPC .. G05D 1/0088; G05D 1/0202; G05D 1/0094; B64C 39/024; B64C 2201/128; B64C 2201/141; B64C 2201/146; B64C 27/00; B60Q 10/083; G08G 5/0069
See application file for complete search history.

(56) References Cited

U.S. PATENT DOCUMENTS

| 7,762,194 | B2 | 7/2010 | Gaigler |
| 8,162,263 | B2 | 4/2012 | Wong et al. |
| 9,085,362 | B1 | 7/2015 | Kilian et al. |
| 9,205,922 | B1 | 12/2015 | Bouwer |
| 9,308,994 | B2 | 4/2016 | Uskert et al. |
| 2007/0029274 | A1* | 2/2007 | Hambric ................ B66C 1/445 212/251 |

(Continued)

*Primary Examiner* — Michael J Zanelli
(74) *Attorney, Agent, or Firm* — McDonnell Boehnen Hulbert & Berghoff LLP

(57) ABSTRACT

An unmanned aerial vehicle (UAV) is disclosed that may allow for supervisory control interaction by a remote operator to assist with navigation to a target location. The UAV may navigate to a target area and capture and send an image of the target area to the remote operator. The remote operator can then provide a user input that indicates a target location within the target area. Upon receiving an indication of the target area, the UAV can then autonomously navigate to the target location. In some examples, after reaching the target location, the UAV may initiate delivery of a payload at the target location using a retractable delivery system while the UAV hovers above.

17 Claims, 14 Drawing Sheets

(56) References Cited

U.S. PATENT DOCUMENTS

| | | | | |
|---|---|---|---|---|
| 2010/0084513 A1* | 4/2010 | Gariepy | ................ | B64C 39/024 244/190 |
| 2010/0286859 A1* | 11/2010 | Feigh | ................... | G05D 1/0044 701/25 |
| 2015/0120094 A1* | 4/2015 | Kimchi | ................ | B64C 39/024 701/3 |
| 2016/0189101 A1* | 6/2016 | Kantor | ................ | G08G 5/0013 705/338 |
| 2016/0313736 A1* | 10/2016 | Schultz | .................. | B64D 47/08 |

* cited by examiner

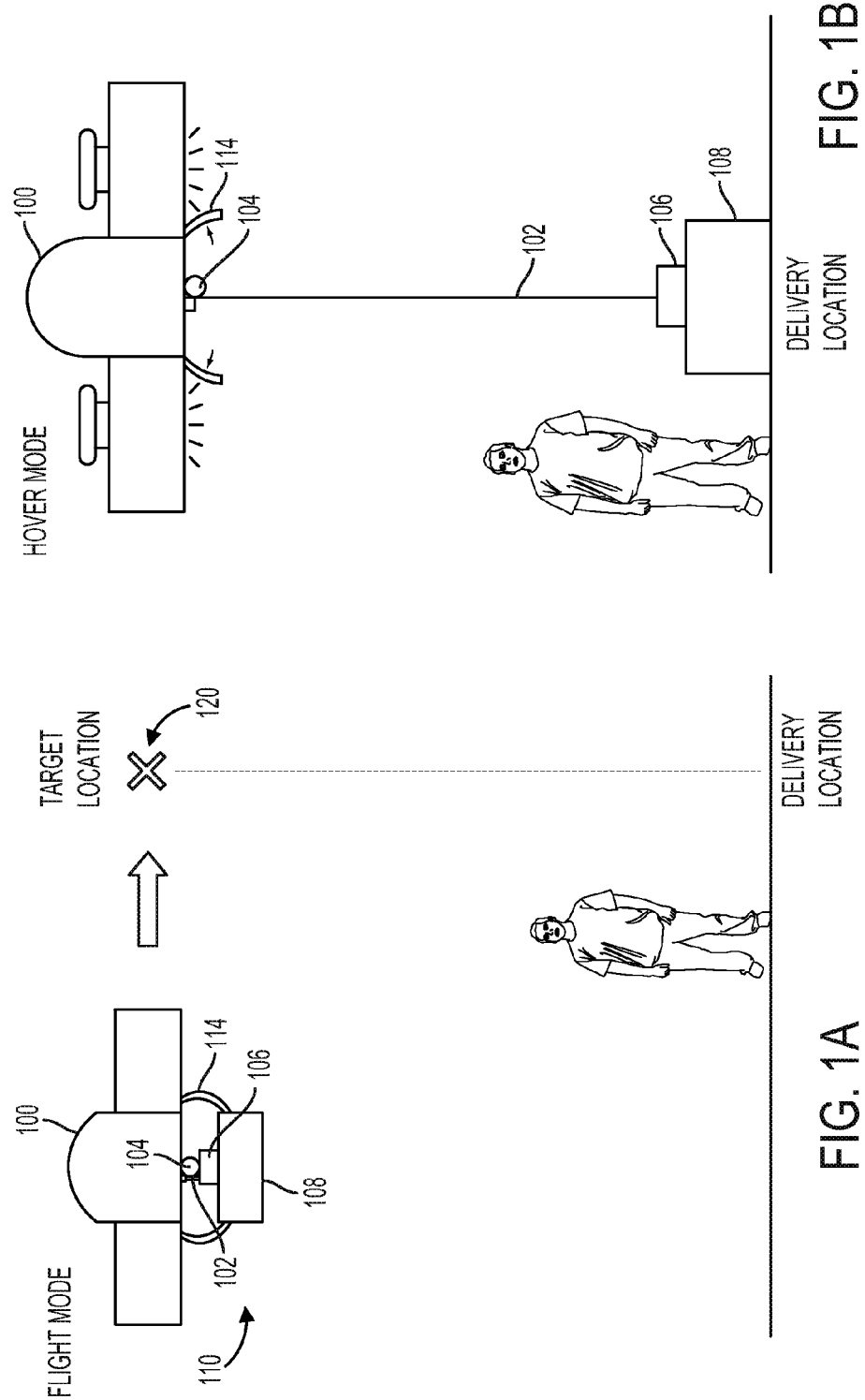

SUPERVISORY CONTROL OF AN UNMANNED AERIAL VEHICLE

CROSS-REFERENCE TO RELATED APPLICATIONS

This application claims priority to U.S. Provisional Patent Application No. 62/009,634, filed Jun. 9, 2014, which is incorporated herein by reference in its entirety and for all purposes.

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while performing another task such as operating a mechanical system for picking up objects, as an example.

Various types of unmanned vehicles exist for various different environments. For example, unmanned vehicles exist for operation in the air, on the ground, underwater, and in space. Unmanned vehicles also exist for hybrid operations in which multi-environment use is possible. Examples of hybrid unmanned vehicles include an amphibious craft that is capable of operation on land as well as on water or a floatplane that is capable of landing on water as well as on land.

SUMMARY

An unmanned aerial vehicle (UAV) is disclosed that may allow for supervisory control interaction by a remote operator to assist with navigation to a target location. The UAV may navigate to a target area and capture and send an image of the target area to the remote operator. The remote operator can then provide a user input that indicates a target location within the target area. Upon receiving an indication of the target area, the UAV can then autonomously navigate to the target location. In some examples, after reaching the target location, the UAV may initiate delivery of a payload at the target location using a retractable delivery system while the UAV hovers above.

Some embodiments of the present disclosure include a UAV. The UAV can include an image capture system, a communication system, and a control system. The communication system can be configured for wireless communications. The control system can be configured to use output from a navigation module to autonomously navigate the UAV in a forward-flight mode to a target area. In response to determining that the UAV is located in the target area, the control system can also be configured to: (i) operate the UAV in a hover mode, (ii) operate the image capture system to capture image data of at least a portion of the target area, and (iii) operate the communication system to send a first data communication based on the captured image data. The first data communication can be directed to a remote terminal. The control system can also be configured to receive, in response to the first data communication, a second data communication comprising an indication of a target location within the target area. The control system can also be configured to determine flight-control commands to navigate the UAV from a current location within the target area to the target location within the target area based on the indication of the target location. The control system can also be configured to cause the UAV to navigate, in hover mode, to the target location in accordance with the determined flight-control commands.

Some embodiments of the present disclosure provide a method. The method can include causing an unmanned aerial vehicle (UAV) to navigate, in a forward-flight mode, to a target area. The method can also include, in response to determining that the UAV is located in the target area: (i) operating the UAV in a hover mode, (ii) operating an image capture system to capture image data of at least a portion of the target area, and (iii) sending a first data communication based on the captured image data, wherein the first data communication is directed to a remote terminal. The method can also include, in response to sending the first data communication, receiving a second data communication comprising an indication of a target location within the target area. The method can also include determining flight-control commands to navigate the UAV from a current location within the target area to the target location within the target area based on the indication of the target location. The method can also include causing the UAV to navigate, in hover mode, to the target location in accordance with the determined flight-control commands.

Some embodiments of the present disclosure provide a method. The method can include displaying image data received from an image capture system situated on an unmanned aerial vehicle (UAV) while the UAV is located in a target area. The displayed image data can include at least a portion of the target area. The method can also include prompting a user for an input indicative of a target location within the target area while displaying the image data. The method can also include receiving a user input indicative of the target location. The method can also include, in response to receiving the user input, sending an indication of the target location to the UAV such that the UAV responsively navigates, in hover mode, from a current location within the target area to the target location within the target area.

Some embodiments of the present disclosure include means for causing an unmanned aerial vehicle (UAV) to navigate, in a forward-flight mode, to a target area. Some embodiments of the present disclosure include means for, in response to determining that the UAV is located in the target area: (i) operating the UAV in a hover mode, (ii) operating an image capture system to capture image data of at least a portion of the target area, and (iii) sending a first data communication based on the captured image data, wherein the first data communication is directed to a remote terminal. Some embodiments of the present disclosure include means for, in response to sending the first data communication, receiving a second data communication comprising an indication of a target location within the target area. Some embodiments of the present disclosure include means for determining flight-control commands to navigate the UAV from a current location within the target area to the target location within the target area based on the indication of the target location. Some embodiments of the present disclosure include means for causing the UAV to navigate, in hover mode, to the target location in accordance with the determined flight-control commands.

Some embodiments of the present disclosure include means for displaying image data received from an image capture system situated on an unmanned aerial vehicle (UAV) while the UAV is located in a target area. Some embodiments of the present disclosure include means for prompting a user for an input indicative of a target location within the target area while displaying the image data. Some embodiments of the present disclosure include means for receiving a user input indicative of the target location. Some embodiments of the present disclosure include means for, in response to receiving the user input, sending an indication of the target location to the UAV such that the UAV responsively navigates, in hover mode, from a current location within the target area to the target location within the target area.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 1A and 1B show a UAV that includes a payload delivery system, according to an example embodiment.

DETAILED DESCRIPTION

Figure 2A:
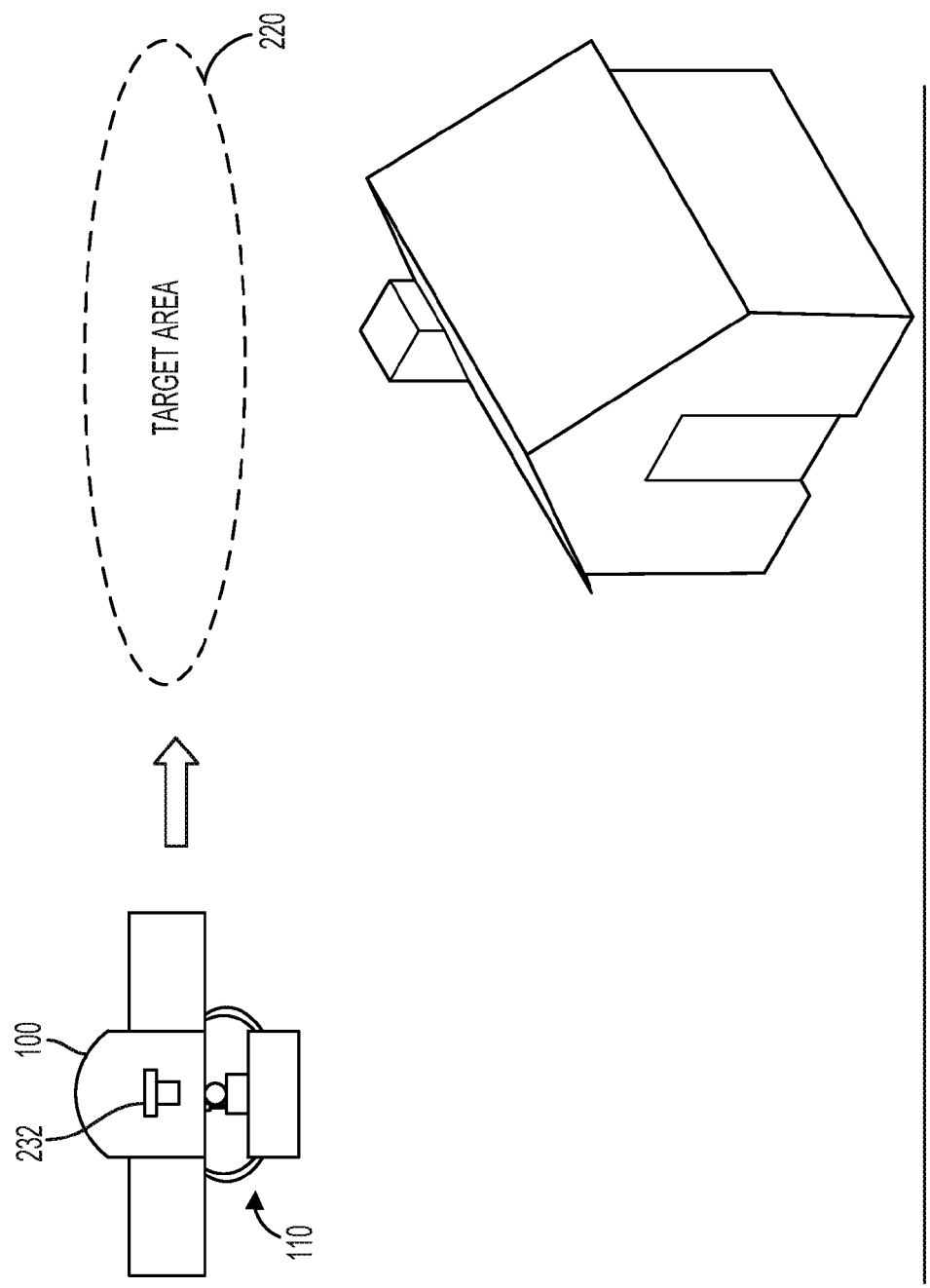
FIGS. 2A, 2B, and 2C show a UAV that delivers a payload at a location specified by a supervisory control system, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Embodiments described herein may relate to and/or may be implemented in a system in which unmanned vehicles, and in particular, "unmanned aerial vehicles" (UAVs), are configured to autonomously navigate to target locations based in part on supervisory control exercised by a remote operator. The disclosed system allows for supervisory control interaction by a remote operator to assist with navigation to a target location. The UAV may navigate to a target area and capture and send an image of the target area to the remote operator. The remote operator can then provide a user input that indicates a target location within the image of the target area. Upon receiving an indication of the target area, the UAV can then autonomously fly to the target location. In some examples, after reaching the target location, the UAV may initiate delivery of a payload at the target location using a retractable delivery system while the UAV hovers above.

Example embodiments may evaluate a variety of factors in order to intelligently prompt a user to, e.g., exercise supervisory control of a UAV. In comparison to fully autonomous systems, this approach may help a UAV to operate in more situations than might otherwise be possible. For example, depending on the capabilities of a given UAV, there may be scenarios that require, or at least benefit from, input from experienced human operators in order to safely and effectively analyze and interpret the UAV's environment, maneuver the UAV through its environment, and/or control interactions of the UAV with objects in its environment. For example, upon certain conditions detected by the UAV, a remote human operator can be prompted to select from amongst alternate plans of action or otherwise approve or alter the UAV flight.

To illustrate an application of intelligently initiated supervisory control, consider a scenario in which a UAV delivers a payload to a delivery location. In this scenario, the general area of the target location may be specified by a street address or GPS coordinates, for example. The UAV can be loaded with the payload to be delivered, and then navigate to the general area of the delivery location. Once within the general area (e.g., within a predetermined range of the general location), a remote operator can be prompted to provide input indicative of a more specific target location at which to deliver the payload.

While awaiting input, the UAV may enter into a hover mode and a downward-facing camera can capture an aerial view of the area including the delivery site. The remote terminal can display the aerial view and prompt the remote human operator to select a particular location depicted within the aerial view. In some cases, the remote terminal may display the aerial view with an overlaid cross-hair or ring or other visual indication of a default delivery location, which may be based on the initially provided nominal target location or based on automatic image analysis of the aerial view and recognition of certain features, such as stairs, doors, driveways, and so forth. The remote operator may simply accept the default location, or may indicate a new delivery location (e.g., by selecting a position on the display with a mouse or touch screen or similar).

In some examples, the downward-facing camera on the UAV that captures the aerial view is stabilized via a three-dimensional gimbal mount such that it provides a substantially fixed point of view relative to the orientation of the UAV. Thus, a particular pixel location on the aerial video feed corresponds to a depicted location directly below the UAV's current location. Similarly, a given pixel location on the video feed can be mapped to a particular translational offset, which is scaled based on the current elevation of the UAV. In practice, the delivery location selected by the remote operator via the user interface can be converted to a two-dimensional translational offset from the UAV's current location (e.g., specified by direction and distance). The UAV can receive an indication of the remote operator selected delivery location (e.g., an indication of the translational offset to traverse) and the UAV can move based on the indication so as to be positioned directly above the selected delivery location.

Once in position, the UAV can then autonomously deliver the payload using a payload delivery system. The delivery operation may involve lowering the payload to the ground using a retractable tether that suspends the payload from the UAV. Once the payload reaches the ground, the payload can be released using a payload-release mechanism, which may be an assembly that opens or otherwise adjusts to release the payload once on the ground. The payload-release mechanism can then be refracted to the UAV using the tether, and the UAV can depart the delivery location.

The remote human operator may select a particular delivery location based on a variety of factors, such as the existence of obstacles, an indication of user preferences, or otherwise resort to their understanding of the most preferred location to deliver the particular payload. For example, at a residential address, the default location may happen to coincide with the driveway, where the delivered item may be run over by a vehicle, or with a parked car, or shrubbery, or a child's toy, or a pedestrian, or an animal, or another fixed or transient delivery obstacle. The remote operator can analyze the real time aerial video feed and select an a delivery location depicted in the aerial view that is free of such obstacles. In another example, the remote operator may be presented with an indication of preferences for the particular delivery location (e.g., preferences indicated by a resident at that street address, such as an instruction to leave items on the front walkway, or close to the steps, or on the back deck, etc.), and the remote operator can make a corresponding selection to the extent feasible in view of the real time video feed. In another example, a remote operator may select a particular location based on their understanding of the size and/or weight of the payload, which information may be displayed to them to assist in making such real time determinations.

Once the UAV receives a communication providing an approval of the default delivery location, or instructions to move to an alternative delivery location, the UAV can autonomously deliver the payload. For example, the UAV can unreel (or otherwise deploy) a tether that is attached to a payload-release mechanism, which is secure to the payload. The payload is thereby suspended from the UAV and lowered to the ground as the tether is payed out. Once on the ground, the payload-release mechanism can release or otherwise disengage from the payload, and leave it on the ground as the payload-release mechanism is refracted back to the UAV. The assembly locks back into place on the UAV, and the UAV can then return to its base of operations.

In other circumstances, supervisory input may be prompted by providing a user interface that activates options to instruct the UAV to deploy parachutes, or alter its destination or heading in response to detecting adverse conditions. For example, if the UAV detects that its control systems or power systems are unreliable or insufficient to reach its intended destination, a remote operator can be provided with a real time feed of video captured by the UAV and the remote operator can be prompted to provide instructions as to a most-desirable location to make a previously-unplanned landing. The remote operator can then identify a location least likely to inflict harm on the surrounding environment. Other adverse conditions may include weather conditions, high wind, precipitation, lightening, battery or propulsion system failures, and other weather conditions which make flight difficult and/or confuse sensors relied on by autonomous obstacle avoidance systems. Other adverse conditions may include detecting that the UAV measures roll, pitch, or yaw readings outside of normal range, or beyond predetermined threshold values.

When determining alternate routes, or making decisions about potential emergency landing locations, a remote operator may also be presented with a view that is colored, shaded, and/or highlighted with an overlay to indicate particular features on the view shown, such as an indication of inhabited regions, major roadways, water, etc. Such a view may efficiently present information to the remote operator when identifying landing locations and/or route corrections.

II. EXAMPLE SYSTEM FOR DELIVERING A PAYLOAD FROM A HOVERING UAV

FIGS. 1A and 1B show a UAV 100 that includes a payload delivery system 110, according to an example embodiment. As shown, payload delivery system 110 for UAV 100 includes a tether 102, a tether-deployment mechanism 104, and a payload-release mechanism 106 coupled to the tether 102. The payload-release mechanism 106 can function to alternately secure a payload 108 and release the payload 108 upon delivery. The tether-deployment mechanism 104 can function to unreel and retract the tether 102 such that the payload-release mechanism 106 can be lowered to the ground and retracted back to the UAV 100. The payload 108 may itself be an item for delivery, and may be housed within (or otherwise incorporate) a parcel, container, or other structure that is configured to interface with the payload-release mechanism 106. In practice, the payload delivery system 110 of UAV 100 may function to autonomously lower payload 108 to the ground in a controlled manner to facilitate delivery of the payload 108 on the ground while the UAV 100 hovers above.

As shown in FIG. 1A, the payload delivery system 110 may function to hold the payload 108 against or close to the bottom of the UAV 100, or even inside the UAV 100, during flight from a launch site to a target location 120. The target location 120 may be a point in space directly above a desired delivery location. Then, when the UAV 100 reaches the target location 120, the UAV's control system may operate the tether-deployment mechanism 104 such that the payload 108, secured by the payload-release mechanism 106, is suspended by the tether 102 and lowered to the ground, as shown in FIG. 1B. In an example, a control system detects that the payload 108 has been lowered to a point where it is at or near the ground (e.g., at the delivery location), the control system may responsively operate the payload-release mechanism 106 to release the payload 108, and thereby detach the payload 108 from the tether 102. As such, the UAV's control system may use various types of data, and various techniques, to determine when the payload 108 and/or payload-release mechanism 106 have lowered to be at or near the ground. Further, the data that is used to determine when the payload 108 is at or near the ground may be provided by sensors on UAV 100, sensors on the tether 102, sensors on the payload-release mechanism 106, and/or other data sources that send data to the UAV control system.

A. Tether

In practice, the tether 102 used to suspend the payload-release mechanism 106 (and payload 108) from the UAV 100 may be formed from a variety of materials. The tether 102 may include, for example, high tensile-strength polymeric fibers, metallic and/or synthetic cables, and other materials that exhibit relatively high tensile-strength per unit weight. The tether 102 may also be selected, at least in part, to be a material that is suitable for interfacing with the tether-deployment mechanism 104.

B. Tether-Deployment Mechanism

In an example the tether-deployment mechanism 104 may include or take the form of a winch that is configured to deploy the tether with a payload attached thereto (e.g., via the payload-release mechanism 106). Such a winch may include a motor (e.g., a DC motor) that can be actively controlled by a servomechanism (also referred to as a "servo") and a microcontroller. The microcontroller may output a desired operating rate (e.g., a desired RPM) for the winch, which may correspond to the speed at which the payload 108 should be lowered towards the ground. The servo may then control the winch so that it operates at a desired rate. In addition, the winch can be used to retract the tether 102 and the payload-release mechanism 106 attached thereto following delivery of the payload 108. Thus, the winch may function to reverse its direction of rotation to achieve retraction.

In some cases, the tether-deployment mechanism 104 may incorporate or be associated with an encoder that senses rotation of the spool letting out (or reeling in) the tether. Data from such an encoder can then be used by a control system of the UAV 100 to help in determining the distance between the payload 108 and the ground as the payload 108 is being lowered.

In addition, the tether-deployment mechanism 104 may vary the rate at which the payload 108 is lowered to the ground or the rate at which the payload-release mechanism 106 is retracted back to the UAV 100. For example, a microcontroller may change the desired rate of lowering and/or retraction according to a variable rate profile and/or in response to other factors in order to change the rate at which the payload 108 descends towards the ground. To do so, the tether-deployment mechanism 104 may adjust the amount of braking or the amount of friction that is applied to the tether. For example, to vary the deployment rate, the tether-deployment mechanism 104 may include friction pads that can apply a variable amount of pressure to the tether. As another example, a line-deployment mechanism 104 can include a motorized braking system that varies the rate at which a spool unwinds the tether 102 during lowering, or reels in the tether 102 during retraction, by making adjustments to a motor speed (e.g., RPM) or gearing applied to the motor. Other examples are also possible.

In some examples, the tether-deployment mechanism 104 may be attached to the payload-release mechanism 106, which is lowered with the payload 108, rather than being secured to a housing of the UAV 100. For example, a winch could be attached to the top of the payload-release mechanism 106. In such an example, the winch may be operable to hold the payload-release mechanism 106 (and the payload 108) at or near the bottom of the UAV 100 during flight to the delivery location. Then, upon arriving at the delivery location, the winch may function to lower the payload 108 by releasing the tether 102 and/or using a brake to adjust the rate at which the tether 102 is released in accordance with a variable rate. Moreover, in an example that omits the payload-release mechanism 106, such a top-mounted winch may be mounted directly to the payload 108.

C. Payload-Release Mechanism

In some embodiments, the payload 108 and/or payload-release mechanism 106 may be designed with features that help to prevent the payload 108 and/or the payload-release mechanism 106 from getting stuck or caught during descent (e.g., to prevent getting caught and/or tangled in a tree or on a power line). For instance, the payload 108 and/or payload-release mechanism 106 may take the form of or be housed in a teardrop-shaped housing, or another shape that can incorporates surfaces that move obstacles aside so as to allow the payload-release mechanism 106 to be more easily moved up and down by the tether 102 without getting stuck.

The payload-release mechanism 106 can also include one or more sensors and a communication interface to allow data from the sensors to be sent to a control system on the UAV, or perhaps elsewhere. The payload-release mechanism 106 may include, for example, accelerometers or other inertial motion sensors, an altimeter, and/or an active ranging system. Data from the sensors on the payload-release mechanism 106 can then be used to estimate the altitude of the payload-release mechanism 106 as it is lowered to the ground. For example, the accelerometer data and/or altimeter data can be used to determine how far the payload-release mechanism 106 (and the payload 108) have been lowered down the tether 102, and thus how much distance remains to the ground. In addition, data from the accelerometer may be used to detect a collision with the ground by the payload-release mechanism 106 and/or the payload 108. Such a collision event may be indicated by the accelerometer data as an abrupt acceleration event with a characteristic signature, for example. Information from such sensors can then be communicated to the UAV 100 over a wireless communication link and/or by transmitting signals through the tether 102.

The payload-release mechanism 106 may include grippers, fasteners, or other engaging surfaces that function to secure the payload 108 (e.g., by applying pressure to the payload 108 or by engaging corresponding surfaces of the payload 108). In some cases, the payload 108 may include one or more apertures or other standardized interfacing features configured to interface with the payload-release mechanism 106. Thus, the payload-release mechanism 106 may include prongs or the like that interface with the payload 108 by passing through the payload's apertures (or otherwise engaging standardized features). The payload-release mechanism 106 can also release the payload 108 by disengaging the grippers or engaging surfaces, or by detaching from the payload's standardized features.

In some cases, the payload-release mechanism 106 alternates between securing the payload 108 and releasing the payload 108 by actuating a mechanical feature that interfaces with the payload 108. Such actuating mechanical features can take a variety of forms. For instance, the payload-release mechanism 106 may include opposable arms secured to the end of the tether 102. The opposable arms can be used to grip the payload 108 while lowering the payload 108 from the UAV 100, and then can be opened to release the payload 108 once the payload 108 is on the ground. The payload-release mechanism 106 may also take the form of a container, bucket, cage, or other enclosure with a bottom that can be opened. While the payload 108 is lowered from the UAV 100, the payload 108 can be secured within the enclosure, and then the bottom of the enclosure can be opened once payload 108 is on the ground, which allows the enclosure to be retracted back to the UAV 100 while the payload 108 remains on the ground.

Various other types of payload-release mechanisms are also possible. The form of a payload-release mechanism for a particular implementation may depend on, for example, the types of payloads to be delivered and the environmental conditions in which delivery will be made. For example, the payload-release mechanism 106 may be positioned on the tether 102 or at the top of the tether 102, and may be operable to cut the tether or release the tether from the UAV 100 when the payload 108 is at or near the ground. Other examples are possible.

When the payload-release mechanism 106 includes sensors, communication systems, electromechanical features, and/or other aspects that consume electrical power, the payload-release mechanism 106 can also include a power supply. The power supply may include a battery and/or a capacitive device, for example. The power supply may also be recharged by an electrical contact with the UAV 100 while the payload-release mechanism 106 is secured to the UAV 100 (e.g., during flight mode operations of the UAV).

Further, in some implementations, the payload delivery system 110 may omit the payload-release mechanism 106. For example, the payload 108 may incorporate a rolling mechanism that traverses the tether 102 and simply rolls off the end of the tether 102 upon reaching the end, thereby releasing the payload 108 from the UAV 100.

D. Control System

The UAV 100 may include a control system to provide various functions described herein. The control system may include or take the form of program instructions stored in a non-transitory computer-readable medium and may also include a variety of functional modules implemented by software, firmware, and/or hardware.

The control system may be configured to autonomously navigate the UAV 100 toward a specified destination. For example, the control system may determine a set of flight-command instructions that cause propulsion systems of the UAV 100 to operate such that the UAV flies through a set of waypoints that define a route to the specified destination. Among other factors, the control system may plan routes based on information from other aerial vehicles (or control systems therefore) and/or based on pre-determined guidance regarding allowable routes, altitudes in particular regions, etc. The control system may also be configured to operate the payload delivery system 110 to controllably lower the payload 108 to the ground, release the payload 108, and then retract the payload-release mechanism 106 back to the UAV 100. Thus, the control system can function to regulate the operation of a variety of actuators, servo controls, and other electromechanical devices that are involved in the operation of the payload delivery system 110.

The control system of UAV 100 may also intelligently control the payload-release mechanism 106 to release the payload 108 at or near the ground. For example, the control system may trigger the payload-release mechanism 106 to release the payload 108 after a certain length of the tether 102 has been let out by the tether-deployment mechanism 104, such that it is expected that the payload 108 is on the ground, or near enough to the ground that it can safely drop to the ground. The control system may also receive sensor data from an accelerometer on the payload-release mechanism 106, and determine that the payload 108 is on the ground when the accelerometer data indicates that the payload had an impact with the ground. Other examples are also possible in which the control system can function to determine that the payload 108 is at or near the ground and then responsively cause the payload-release mechanism 106 to release the payload 108.

The length of the tether 102 that has been let out by the tether-deployment mechanism 104 may also be used to determine the distance between the payload 108 and the ground (i.e., the altitude of the payload 108). More specifically, given the height of the payload 108, the height of the payload-release mechanism 106, the length of the tether 102, and the altitude difference between the top of the line 102 and the point where altitude is measured by the UAV 100, the UAV 100 may determine the distance between the bottom of the payload 108 and the ground. Thus, the distance between the payload 108 and the ground can be updated as the line 102 is deployed to, e.g., determine when to change the deployment rate of line 102 in accordance with a given variable deployment rate profile. In some cases, the control system can operate the payload delivery system 110 such that the rate of descent of the payload 108 is altitude dependent. For example, the control system can initially allow the payload 108 to descend at a maximum rate of descent. The control system can monitor information from sensors indicating the descending altitude of the payload 108, and upon detecting that the payload 108 is within a particular distance of the ground, the control system can cause the tether-deployment mechanism 104 to begin slowing the descent of the payload 108. The control system may cause the rate of descent to slow to a predetermined safe speed by the time the payload 108 is near enough to the ground that it could interfere with (or be grabbed by) objects or people on the ground. Similarly, the control system may also cause the payload-release mechanism 106 to ascend back to the UAV 100 in an altitude-dependent manner.

E. Example Payloads

In some examples, the payload 108 may take the form of a container that includes medical-support devices and/or other items intended to help in a medical situation. In other examples, the payload 108 may itself be a medical-support device (e.g., a defibrillator) or another type of medical support item, such as a pharmaceutical medicine. Generally, the payload 108 may be any type of item to be delivered, including non-medical items such as goods ordered from a non-medical delivery service or items shipped through a shipping service.

F. Emergency-Release System

In yet a further aspect, a UAV 100 may include an emergency system (not shown in the Figures), which is configured to cut or release the tether 102. In particular, the UAV 100 may be configured to detect certain emergency situations, such as the tether 102, payload-release mechanism 106, and/or payload 108 becoming stuck (e.g., in a tree), and to automatically cut the tether 102 when such an emergency situation is detected. The emergency situation may also involve the tether 102 and/or payload-release mechanism 106 being grabbed by an individual on the ground. By cutting the tether 102 in such emergency situations, the UAV 100 functions to prevent damage to or from the UAV 100 (e.g., caused by the UAV 100 being pulled to the ground).

Various types of emergency-release mechanisms are possible, which may be configured to cut the tether 102 holding the payload 108 and/or payload-release mechanism 106 or otherwise release the tether 102 from the UAV 100.

Further, various types of data may be analyzed to determine if and when an emergency-release mechanism should be used to release the payload. The control system can function to determine that such an emergency situation has occurred based on data from sensors on the UAV 100 and/or the payload-release mechanism 106. For example, the UAV's control system could analyze image data from a camera, data from a line-tension sensor, and/or other types of data to determine that the payload is stuck or that deployment of the payload has otherwise failed, and responsively use the emergency-release mechanism to release the payload 108. In some cases, the control system may receive an indication of the emergency from a remote terminal where a supervisory control operator is monitoring sensor data and has determined that the tether 102 should be cut.

F. Other Aspects

In some examples, the UAV 100 may include features that can hold the payload 108 in place and/or stabilize the payload during flight. Such features may be mechanically adjustable such that the tether-deployment mechanism 104 can lower the payload 108 upon arriving at the delivery location. For instance, in the configuration shown in FIG. 1A, UAV 100 includes moveable retaining brackets 114. The brackets 114 may interface with the payload 108 and/or assembly 106 to hold the payload 108 in place during flight, as shown in FIG. 1A. And when UAV 100 reaches the delivery location, the brackets 114 may be moved away from payload 108, so that the payload 108 can be lowered without interference from the brackets 114. Note that other types of mechanisms may also be used to hold the payload 108 in place and/or to stabilize the payload 108 during flight. Moreover, the payload 108 may be held in place during flight by the assembly 106, without use of any additional features.

In some examples, a UAV 100 may additionally or alternatively be configured to pick up items from the ground using the payload delivery system 110 shown in FIGS. 1A and 1B, or a different type of system.

III. DELIVERY LOCATION SELECTED BY REMOTE OPERATOR

Figure 2B:
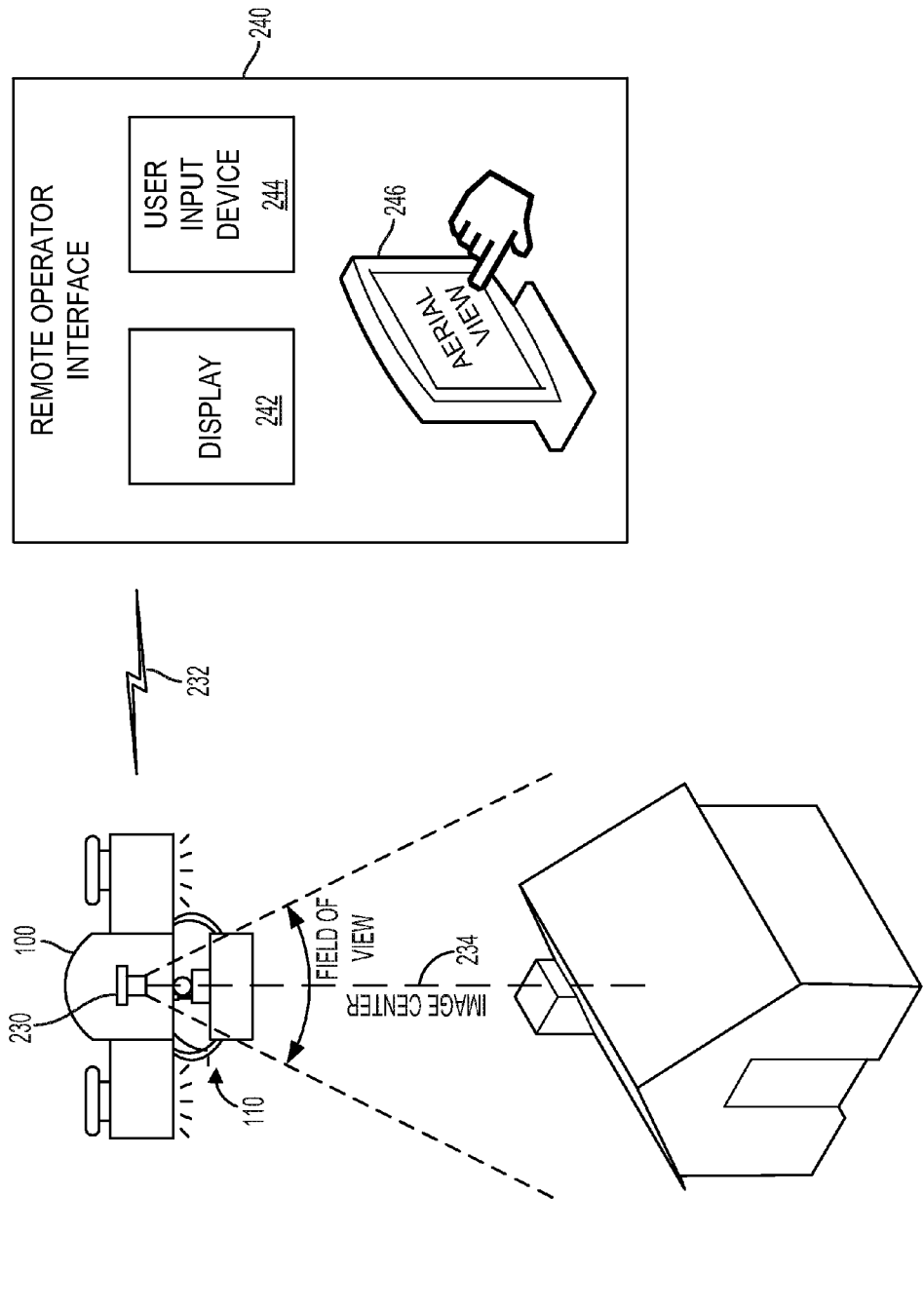
Figure 2C:
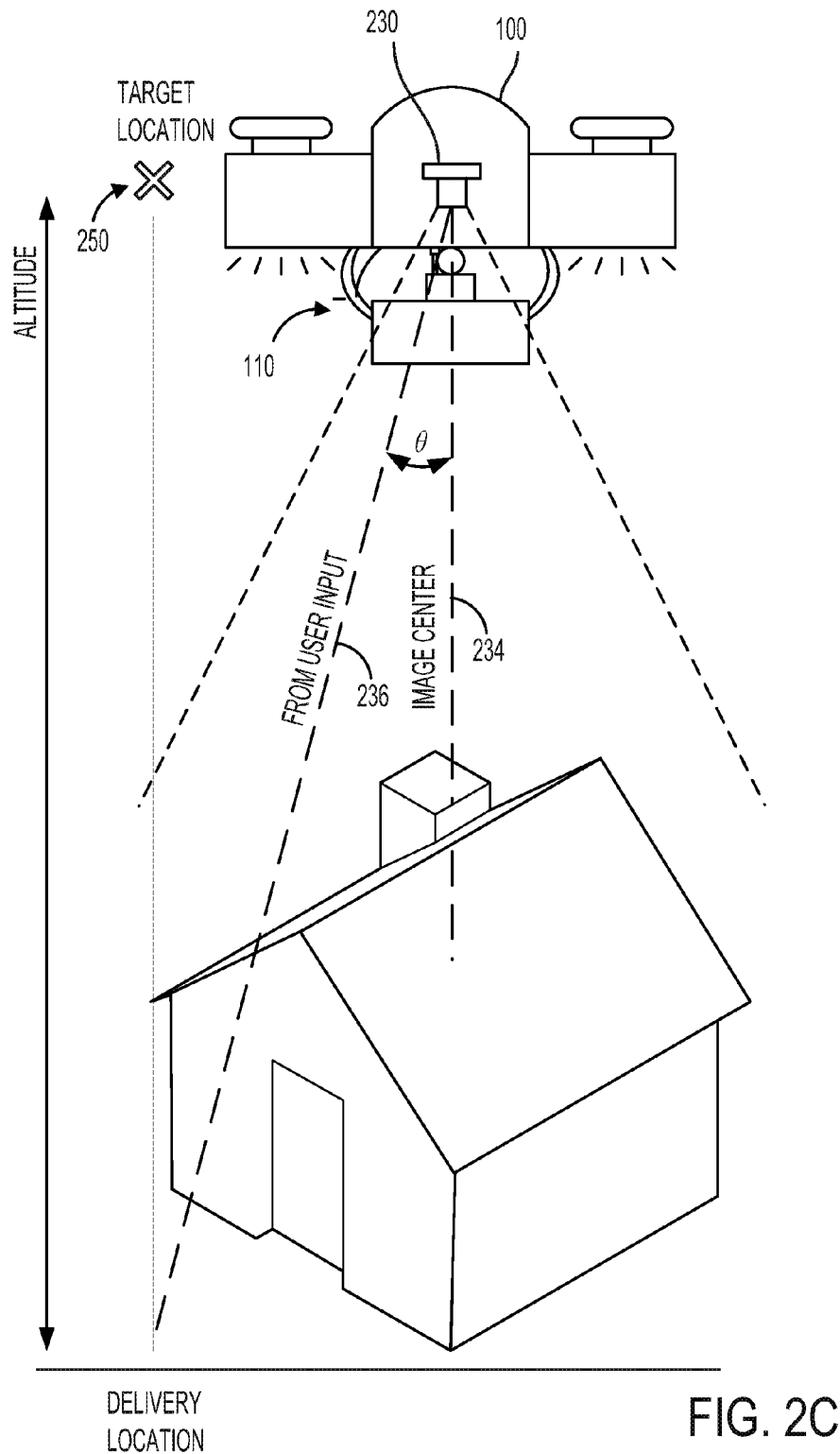

FIGS. 2A, 2B, and 2C show a UAV 100 that delivers a payload at a location specified by a supervisory control system, according to an example embodiment. The UAV 100 includes the payload delivery system 110 described above in connection with FIGS. 1A and 1B. Thus, the UAV 100 can use the payload delivery system 110 to automatically lower a payload to the ground and release the payload while the UAV 100 hovers above. In addition, the UAV 100 allows for the precise delivery location to be at least partially specified by real time input from a remote operator. The remote operator can study a video feed of the delivery site and select a delivery location that is free of obstacles and unlikely to create interference with pedestrian or vehicular traffic, among other factors. The remote operator may even select a delivery location based in part on user preferences and/or instructions associated with the delivery site. The remote operator's selection can then be communicated to the UAV 100, and the UAV can adjust its position accordingly before using the payload delivery system 110 to lower the payload to the ground.

The UAV 100 includes an imaging system 230 that is used to image the delivery site once the UAV 100 is within the target area 220. For example, the imaging system 230 may include a camera that captures video of the delivery site, and the video can then be streamed over a wireless communication network to be viewed by the remote operator. The imaging system 230 may be a camera attached to the UAV 100 by a three-dimensional gimbal mount that stabilizes the orientation of the camera to provide a stable point of view. For instance, the mount may be used to provide a stable downward-facing orientation for the imaging system 230. In some cases, the point of view of the imaging system 230 may be substantially fixed relative to the orientation of the UAV 100. As a result, the spatial relationship between the UAV 100 and objects depicted in an obtained image can be predicted due to the fixed perspective of the imaging system 230. For instance, a particular pixel position approximately in an obtained image from the imaging system 230 may correspond to an approximate delivery location when using the payload delivery system 110.

In FIG. 2A, the UAV 100 is navigating toward a target area 220. The target area 220 may be a region defined by a nominal target location, such as a distance from a GPS coordinate. And the nominal target location may be associated with a street address or other geographic reference point. In an example in which the UAV 100 is used to deliver a payload to a street address, a flight scheduling and planning system may first associate the street address with a GPS coordinate and provide the coordinate to the UAV 100. The UAV 100 can then autonomously navigate in forward-flight mode toward the provided coordinate. Once the UAV 100 determines it is within a particular distance of its nominal target location, the UAV 100 can determine it is within the target area 220. In some cases, the UAV 100 may determine it is within the target area 220 based on being within a threshold estimated time of arrival of a nominal target location. In FIG. 2A, the delivery site includes a house, which is located at a residential street address, and the target area 220 is a region directly above the house.

In FIG. 2B, the UAV 100 is hovering within the target area 220, above the delivery site, and communicating with a remote terminal 240. In some cases, the UAV 100 may automatically switch from flight mode to hover mode in response to determining that the UAV 100 is within the target area 220. While the switch between flight mode and hover mode may vary depending on the form of the particular UAV 100, the switch may involve transitioning a propulsion system of the UAV 100 from generating thrust with a net translational component (e.g., used to move the UAV parallel to the surface of the Earth) to generating thrust without a net translational component (or with a lesser net translational component). In some examples, the transition from flight mode to hover mode may involve moving propellers, ducts, and/or other aspects of the UAV's propulsion system.

The switch from flight mode to hover mode performed in response to the UAV determining it is within the target area of the delivery site may also involve the UAV transitioning from an autonomous mode, in which it navigates to the target area without receiving real time input and/or approvals, to a remote-input mode. In the remote-input mode the UAV may wait for further input and/or authorization from a remote operator and/or central command system before proceeding with further actions (e.g., delivery of the payload). The remote-input mode may therefore involve the UAV hovering in a substantially fixed position while actively gathering data from various sensors and providing that data to a remote operator for use by the remote operator in providing input. For example, the remote-input mode may involve the UAV gathering information indicative of the target area, providing that information to a remote terminal for analysis by a remote operator, and waiting for an input from the remote operator that indicates a particular target location within the target area. The remote-input mode may involve a number of other examples in which the UAV waits for further input and/or authorization from the remote operator before performing further actions in an autonomous and/or semi-autonomous manner.

To facilitate input from a remote terminal, once hovering over the delivery site, the UAV also uses the downward-facing imaging system 230 to obtain images depicting an aerial view of the delivery site. The imaging system 230 has a field of view centered on a line 234. In an example in which the imaging system 230 is stabilized by a mount that provides a substantially fixed point of view relative to the orientation of the UAV (e.g., a three-dimensional gimbal mount), the center line 234 may correspond a point directly below the UAV 100 or another position on the ground with a substantially fixed spatial relationship relative to the UAV 100. The field of view of the imaging system 230 may be sufficient to image the entire delivery site. Thus, in FIG. 2B, the aerial view includes at least a portion of the roof of the house, and some of the immediately surrounding area. Moreover, the field of view of the imaging system 230 may be adjustable using optical features in the imaging system used to adjust magnification (e.g., lenses with adjustable positions). For instance, a control system on the UAV 100 may automatically adjust the field of view of the imaging system 230 based on the current altitude of the UAV 100 and the approximate size of the delivery site so as to provide an aerial view that captures the full delivery site. The field of view may also be adjusted based on inputs from the remote terminal 240.

While hovering and imaging the delivery site, the UAV 100 also sends data from the obtained images to the remote terminal 240 using a wireless communication link 232. The remote terminal 240 includes a user interface to allow an operator to analyze the aerial view obtained by the UAV's imaging system 230 and select a delivery location. The remote terminal 240 can include a display 242 and a user input device 244. For example, the remote terminal 240 may include a touchscreen display 246 that displays the aerial view from the UAV's imaging system and allows a remote operator to select a delivery location by touching a position on the touchscreen display 246. Many other examples of user input devices are also possible that allow a user to provide an input indicative of a delivery location that is depicted within the displayed aerial view.

In FIG. 2C, the UAV 100 begins flying to a target location 250 that corresponds to the delivery location specified by the user input from the remote operator. For example, the UAV 100 may receive a communication from the remote terminal 240 (via the wireless link 232) that includes an indication of the target location 250. The target location 250 may be situated immediately above the operator-specified delivery location. Thus, the target location 250 may be a position from which the UAV 100 can use the payload delivery system 110 to deliver its payload at the operator-selected delivery location. The selected delivery location may be a position on the ground that is depicted within the view displayed at the remote terminal 240 (i.e., within the field of view of the imaging system 230). In FIG. 2C, the selected delivery location is represented by the dashed line 236, which shows the delivery location being near the front door of the house.

A. Selection of Delivery Location

As an example, the remote operator may have evaluated real time video of the delivery site from the UAV's imaging system 230, and determined that the area near the front door would avoid interference with obstacles and be the most satisfactory location to leave the payload in view of potential obstacles. Among other factors, the remote operator may select the delivery location based on the presence of vehicles, pedestrians, animals, landscaping, walkways, driveways, and perhaps based in part on a delivery location preference associated with the delivery site. In an example in which the remote operator evaluates delivery location preference(s), a database can store preferred delivery locations associated with respective street addresses (or other delivery sites). Delivery location preferences may become associated with individual street addresses by people living at those addresses expressing their preference for delivery location, perhaps by registering their information with a delivery service operator or otherwise providing their express permission to document and maintain such information.

While the remote operator is selecting the delivery location, the remote terminal's user interface may display a delivery location preference associated with the particular delivery site, if any such preference is previously known. For instance, the remote terminal may display text reading "front porch" or "back deck" or the remote terminal may display an aerial photo with a particular area highlighted or indicated, or the remote terminal may highlight or create a color-shaded overlay a particular region of the video streamed aerial view of the delivery site. In some examples, the region(s) to highlight may be determined in part based on automatic image analysis performed by the computing system at the remote terminal 240. For instance, the remote terminal 240 may automatically recognize roofing materials and prevent selection of the roof as a delivery location, or may automatically recognize sidewalks, driveways, doors, etc. and may automatically highlight particular regions based on one or more factors including stored delivery location preference(s). Once the delivery location preference is displayed to the remote operator, the remote operator can then weigh the delivery location preference and attempt to select a location in accordance with the preference if safety and other concerns do not prevent such a selection.

B. UAV Moves to Target Location Corresponding to the Delivery Location

Information regarding the delivery location 236 selected by the remote operator may be communicated to the UAV 100 in a variety of ways. In some cases, the operator-specified delivery location may be associated with a GPS coordinate for the target location 250, which can be provided to the UAV 100, and the UAV 100 can then autonomously navigate to the provided coordinate. In some cases, the operator-specified delivery location may be associated with a translational offset for the UAV 100 to traverse, relative to the current location of the UAV 100, to reach the target location 250. Determining a particular translational offset to traverse, relative to the UAV's current location, may be more accurate than providing a coordinate and allowing the UAV to navigate to the coordinate without regard to its existing location, due to the finite positional accuracy of GPS-based navigation systems. Determining the translational offset (e.g., bearing and distance) for the UAV 100 to traverse may be based on the spatial relationship between the imaging system's field of view and the UAV's orientation.

Because the imaging system 230 can be mounted so as to provide a substantially fixed field of view relative to the orientation of the UAV 100, the specified delivery location 236 can be mapped to a the target location 250 (e.g., immediately above the operator specified delivery location 236) based on the substantially fixed spatial relationship. In one example, the image center (represented by line 234) can correspond to a position depicted in the image that is immediately below the UAV 100. In some cases, the image center 234 may depict a ground location at which the payload would be delivered if the UAV were to use its payload delivery system 110 from its current position. Thus, the image coordinates for the image center 234 (e.g., two-dimensional pixel location) correspond to a current location of the UAV 100. Of course, the image coordinates that correspond to the current location of the UAV 100 may be an image coordinate that is not a center point of the image (e.g., a pixel away from the center of the image).

The operator-selected delivery location 236 can be associated with an image coordinate for the delivery location as it is depicted in the image of the delivery site (e.g., pixel coordinates of selected location). Each coordinate in the image (e.g., pixel coordinate) can be associated with a line between the depicted location and the imaging system 230 (i.e., the optical path of light in each coordinate of the obtained image). Each such line will also define an angle with the image center line 234. The angle with the center line 234, which depends on the total angle subtended by the field of view of the imaging system, can then be used in combination with the altitude of the UAV 100 to determine the total distance to traverse to reach the target location 250 (e.g., the distance may be approximately the altitude of the UAV multiplied by the tangent of the angle).

The direction for the UAV to move in (i.e., the heading of the translational offset) can be determined based on the position of the operator-selected image coordinate within the image. In a system in which the orientation of the UAV's imaging system is fixed with respect to the orientation of the UAV 100, each position in the image can be mapped to a direction, relative to the current location of the UAV, which may correspond to the image center. For example, an image coordinate that is "above" the image center may indicate a forward direction and an image coordinate that is "below" the image center may indicate a reverse direction. In some examples, the direction of the translational offset may be determined by defining a vector between the operator-selected image coordinate and the image coordinate that corresponds to the UAV's current location. The direction of the defined vector corresponds to the direction of the translational offset, and the magnitude of the defined vector corresponds to the distance of the translational offset (although scaled by the UAV's altitude). Other examples of mapping the operator-selected delivery location to a direction and distance of a translational offset for the UAV to traverse from its current location are also possible. Generally, such mapping takes advantage of a substantially fixed spatial relationship between the point of view of the imaging system 230 that depicts the delivery site and the orientation of the UAV 100.

Additionally or alternatively, the translational offset for the UAV 100 to traverse may be determined by a processing system at the remote terminal 240, and the remote terminal 240 may simply communicate an indication of a heading and distance for the UAV 100 to traverse.

C. Additional Remote Operator Input

Once the UAV 100 reaches the target location 250, the UAV can use the payload delivery system 110 to lower the payload to the ground, release the payload, and retract the payload-release mechanism back to the UAV 100, and then autonomously navigate to a landing site (or perhaps another delivery site for a second payload). The UAV 100 may continue to provide real time information to the remote terminal 240 and may be configured to only perform one or more additional functions involved in the delivery process upon receiving input and/or approval from the remote terminal 240.

For example, after traversing the translational offset to reach the target location 250, the UAV 100 may continue to stream video from its downward-facing imaging system 230 and may only initiate the delivery sequence upon receiving an authorization communication from the remote terminal 240. The remote terminal 240 may prompt the remote operator to provide authorization to initiate delivery once the UAV 100 reaches the target location 250. As such, the remote operator may perform a final check to determine whether any obstacles will interfere with delivery just before delivery is initiated. For example, an animal or pedestrian may have moved into the initially-selected delivery location by the time the UAV 100 reaches the target location 250, and the remote operator may then decide to select an alternative delivery location or to wait until they determine it is safe to proceed with the delivery. Additionally or alternatively, the UAV 100 may wait for an authorization communication from the remote terminal 240 before releasing the payload and/or before retracting the payload-release mechanism. Other examples are also possible.

In another example, the remote operator may provide additional inputs to the UAV while the payload is being lowered to the ground. Specifically, while the payload is being lowered using the payload delivery system, the UAV 100 can continue to send image data to the remote terminal 240. The remote operator can observe the provided images and/or video data and determine whether the descent of the payload is being influenced by cross winds that may cause the payload to drift away from the specified delivery location. Descending payloads that are relatively light may be particularly susceptible to such wind-induced movement. Moreover, the wind experienced by descending payloads may differ from the wind on the UAV itself, because the wind speed may vary with altitude and/or due to wind effects between and/or around structures near the ground (e.g., wind breaks and/or wind tunnels created by trees, buildings, etc.). Thus, as the payload descends from the UAV 100, the remote operator can observe the position of the payload relative to the selected delivery location. If the payload is drifting away from the selected delivery location due to wind (or is otherwise offset from the selected delivery location), the remote operator may provide an input to cause the UAV to move so as to compensate for the offset of the descending payload and bring it closer to the selected delivery location. In some examples, the user input from the remote operator may be provided via a joystick that can be manipulated by the remote operator to specify a direction and magnitude of a translational offset for the UAV to traverse so as to compensate for the drift of the payload. In some examples, the remote operator may provide an input that indicates the current location of the payload as it is depicted on the displayed image data of the aerial view of the delivery site.

The indicated image coordinates can then be mapped to a translational offset for the UAV to traverse (e.g., based on a substantially fixed relationship between the point of view of the UAV's imaging system and the orientation of the UAV). Further, the UAV's payload delivery system may be capable of providing at least some positioning of the descending payload without re-positioning the UAV 100. For example, the tether 102 may be passed through one or more pulleys that can be re-positioned (e.g., along a track or robotic arm) so as to change the point from which the tether is deployed. Other examples of user input(s) from the remote operator that cause the UAV to adjust its position so as to account for wind-induced movement of the descending payload are also possible.

D. Example Remote Operator Interface

Figure 3A:
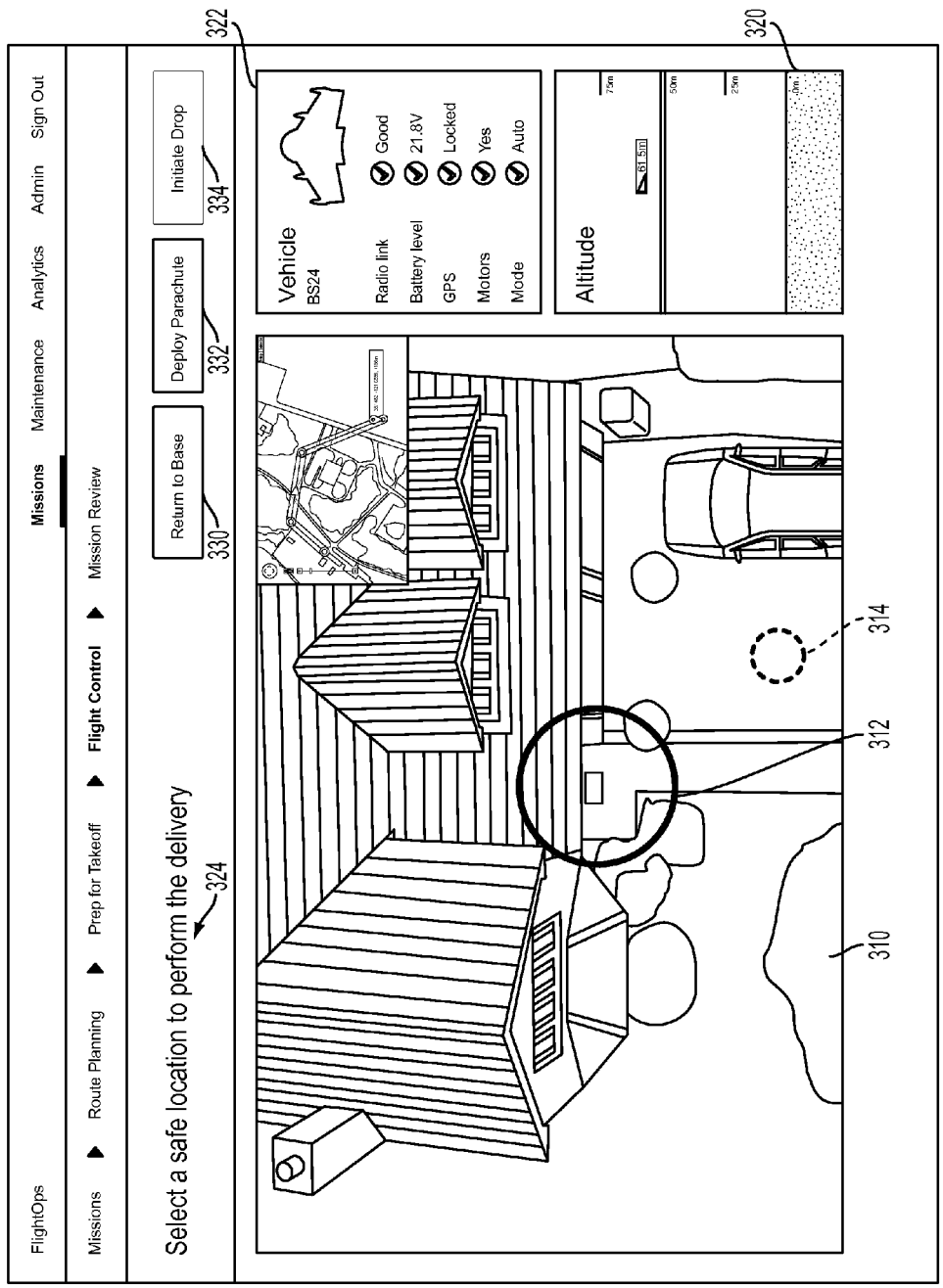
FIGS. 3A, 3B, 3C show a series of example interface displays used in providing supervisory control of a UAV engaged in completing a payload delivery, according to an example embodiment.
Figure 3B:
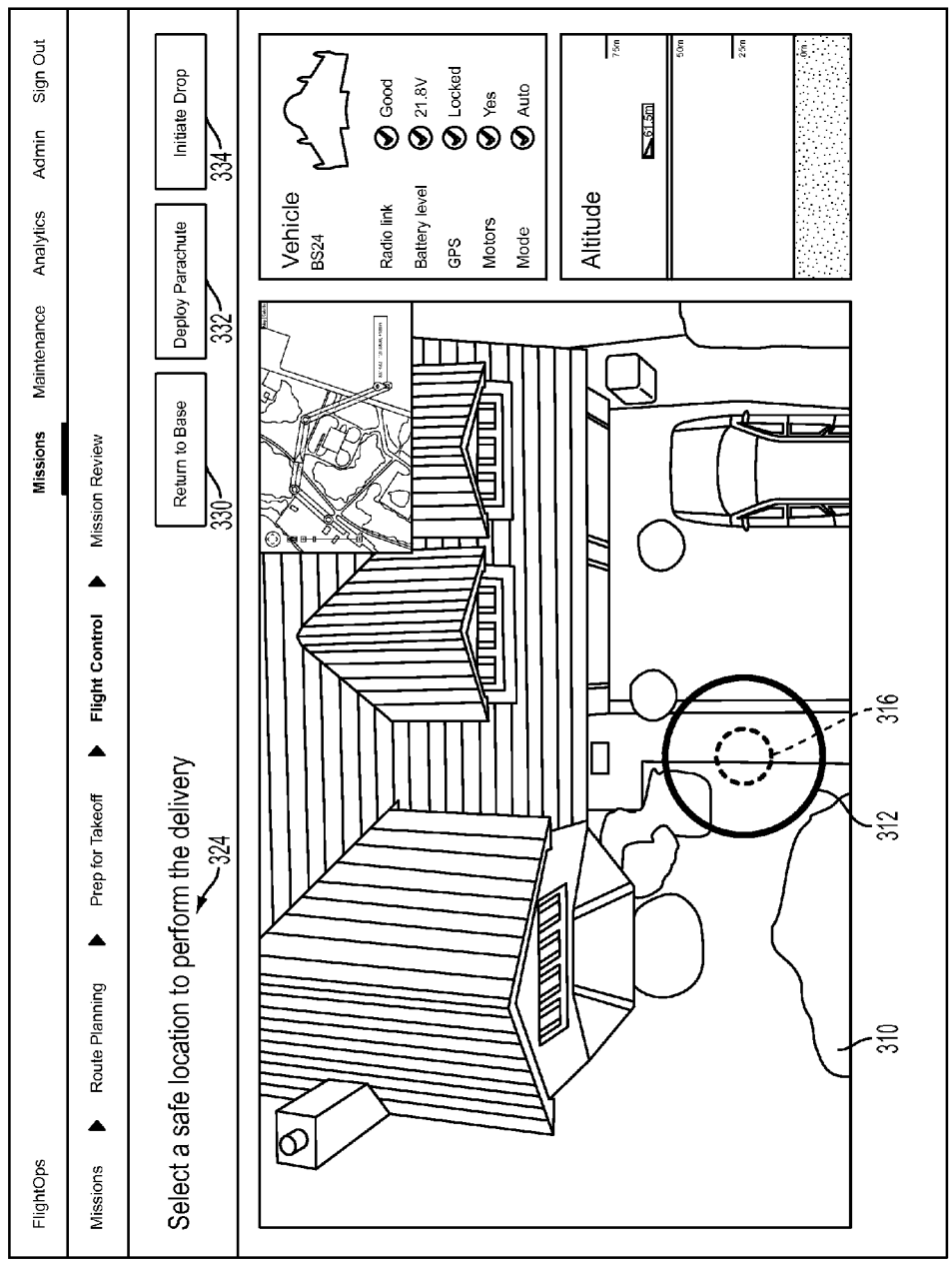
Figure 3C:
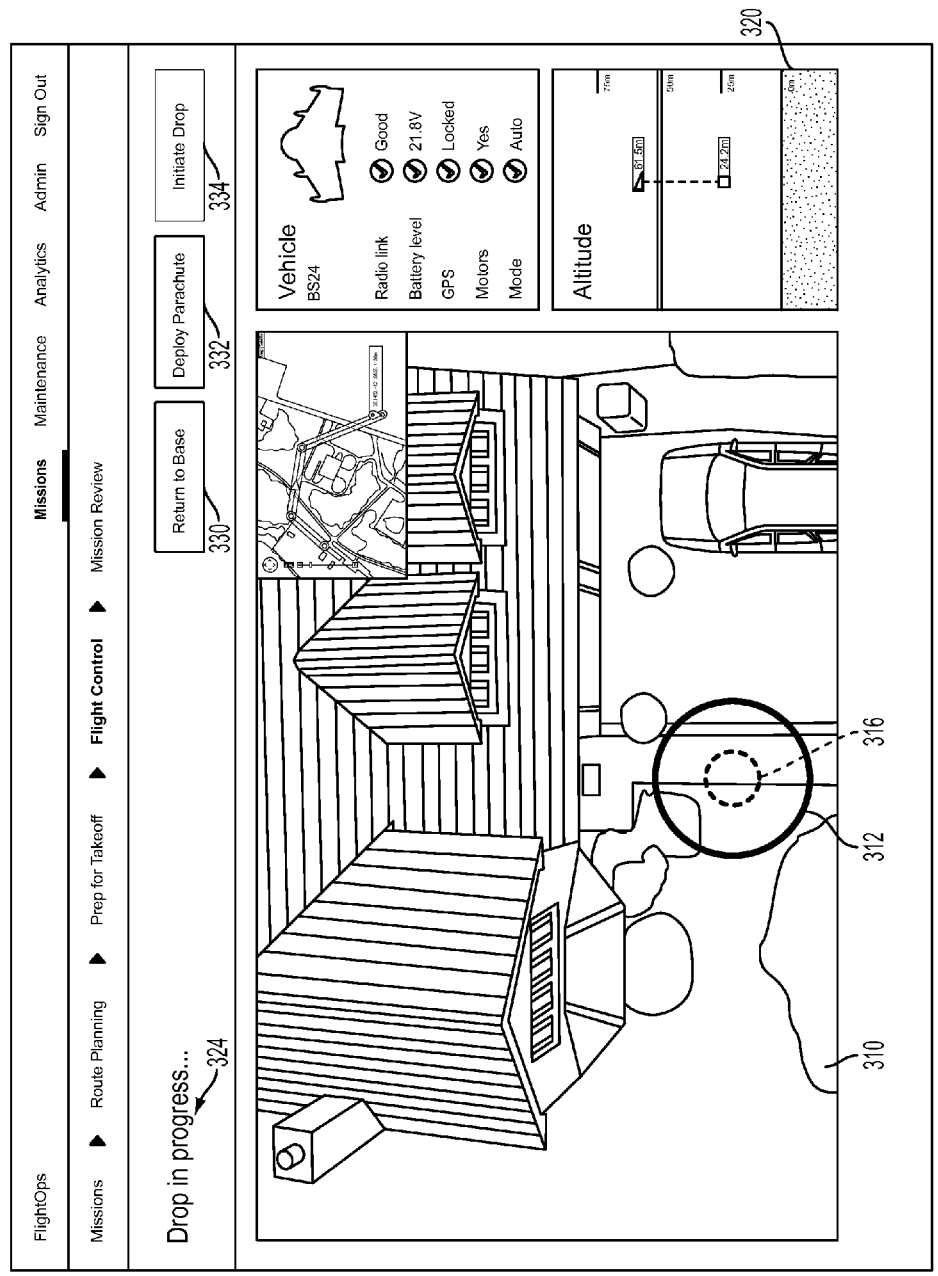

FIGS. 3A, 3B, 3C show a series of example interface displays used in providing supervisory control of a UAV engaged in completing a payload delivery, according to an example embodiment. In FIG. 3A, the user interface display includes a video window 310, an altitude window 320, a UAV status window 322, a status/prompt message 324, and user input areas 330, 332, 334. The altitude window 320 displays information indicating the current altitude of the UAV. The UAV status window 322 displays information indicating the status of various systems on the UAV and about the UAV, such as the UAV model, the status of the radio link, the battery life remaining, the condition of the GPS and motors, and the flight mode of the UAV. Infographics may be used to efficiently indicate items in satisfactory condition, or which require input from the remote operator, as indicated in FIG. 3A. The status/prompt message 324 provides a prompt to the remote operator viewing the display with the message "Select a location to perform the delivery." The user input areas allow the remote operator to command the UAV to: (i) return to its base by selecting area 330 (e.g., with a mouse, touchscreen, or other user input device); (ii) deploy the parachute and make an emergency landing by selecting area 332; and (iii) initiate a delivery drop by selecting area 334. One or more of the input areas 330, 332, 334 may be allowed to be selected only at certain times, and may be displayed in a lighter color or shading during non-selectable times so as to indicate to the remote operator whether those input areas (and corresponding functions) may be selected. For example, the initiate drop function selected by area 334 may only be selected after first selecting a delivery location or approving a default delivery location.

The video window 310 shows a grayscale video feed of an aerial view of a delivery site. The video window 310 can be used by the remote operator to provide an input indicative of a delivery location. Thus, visible in the video window 310 is a house, a walkway, a vehicle, and a driveway, which may be present at a street address at which a payload is to be delivered. Superimposed on the video window 310 is a current location indicator 312 (which may be a color-contrasting circle) and a default location indicator 314. The current location indicator 312 can be an indication of a centroid location above which the UAV is currently hovering. As shown, the current location indicator 312 indicates a location close the front door and including the roof of the depicted house. The default location indicator 314 is also shown as a contrasting circle and can indicate a centroid location of a default or recommended delivery location, and may be based in part on real time analysis of the aerial image data or other factors. In FIG. 3A, the default location indicator 314 indicates a location that is within the driveway.

In FIG. 3B, the video window shows that the remote operator has rejected the default location (indicated by the default location indicator 314) and instead selected a target location on the walkway leading to the front house, which is indicated by a target location indicator 316. The target location may be selected by the remote operator pressing a touchscreen at the location of the target indicator (or using a mouse input to select the location) while the touchscreen depicts the view shown in FIG. 3A. Upon selecting the target location, the target location indicator 316 can appear as a color-contrasted or highlighted circle that represents the target delivery location as a centroid or ring. Following the selection of the target location, an indication of the remote operator's selection can be communicated to the UAV, and the UAV can autonomously navigate to the target location (e.g., by traversing a particular distance and direction from its current location). Following the UAV's movement, the UAV's current location indicator 312 is shown coinciding with the operator-selected target location indicator 316, at which point the input area 334 can become active to allow the remote operator to select area 334 and thereby cause the UAV to initiate delivery.

In FIG. 3C, the remote terminal interface shows that delivery is in progress. The altitude window 320 displays information showing that the payload is being lowered from the UAV and is currently 24.2 meters from the ground while the UAV remains at an altitude of 61.5 meters. In addition, the user input area 334 that allows the remote operator to initiate delivery has been deactivated (i.e., no longer available to be selected), while the delivery operation is ongoing.

The user interface displays shown in FIG. 3A-3C provide just one example implementation in which a remote operator can be prompted to provide input and/or approval prior to the UAV performing functions related to delivering a payload at a target location. Other examples of interface arrangements and prompting mechanisms are also possible, including systems using tactile and/or audio interface mechanisms.

E. Emergency Initiated Remote Operator Input

In some examples, supervisory control may be exercised by a remote operator to select an alternate course of action for the UAV in response to detection of one or more emergency-related conditions on the UAV. As an example, data from sensors on the UAV (or information from other sources) may indicate that adverse weather conditions are being experienced by the UAV, or will shortly be experienced by the UAV. A remote operator can then be prompted to select a safest possible landing site for the UAV. For example, the remote terminal may display a stream of video from the UAV's imaging system and optionally may display measurements from avionics systems on the UAV, such as altitude, bearing, pitch, roll, etc. The remote operator may also be presented with an aerial view of possible landing sites from which to select. The aerial view may be provided from an imaging system on the UAV, if available, or may be provided from other sources (e.g., satellite imagery).

To facilitate timely decision-making by the remote operator, the aerial view may include super-imposed color shading and/or highlighting to indicate regions to avoid (e.g., populated residential areas, roadways, waterways, restricted airspace, and so forth). Similarly, the aerial view may include indications of regions that would provide a suitable emergency landing site, such as unpopulated fields, forests, and so forth. Such shading and/or highlighting may be based on database information that associates particular geographic zones with different categories (i.e., database mapping information) and may be based in part on automatic real time image analysis and object recognition of the aerial image data. For example, a computing system at the remote terminal 240 may analyze real time image data to detect vehicles, pedestrians, animals, trees, roads, other aircraft, and other potential obstacles and cause those areas of the displayed aerial view to be color shaded or highlighted in a manner that assists the remote operator in selecting a possible emergency landing site.

In addition, the remote operator may provide an input that causes the UAV to return to its base (e.g., launch site), to deploy its parachute, or perhaps to cancel its current flight plan and begin a new flight plan. The remote operator may be prompted to provide such inputs in response to a variety of scenarios detected by the UAV and/or remote terminal based on sensor data on the UAV and/or based on other sources of information, such as weather information from a weather monitoring service or flight information from other aircraft or from a flight management system. Examples of such conditions include determining that the propulsion systems or power systems (e.g., battery) are insufficient to complete the planned flight plan or are experiencing an error. Another example may involve measuring roll, pitch, acceleration, and/or change in elevation of the UAV that is greater than (or less than) threshold value(s). Other examples in which sensor data or other sources of information indicate input should be sought from a remote operator are also possible.

IV. EXAMPLE OPERATIONS

Figure 4A:
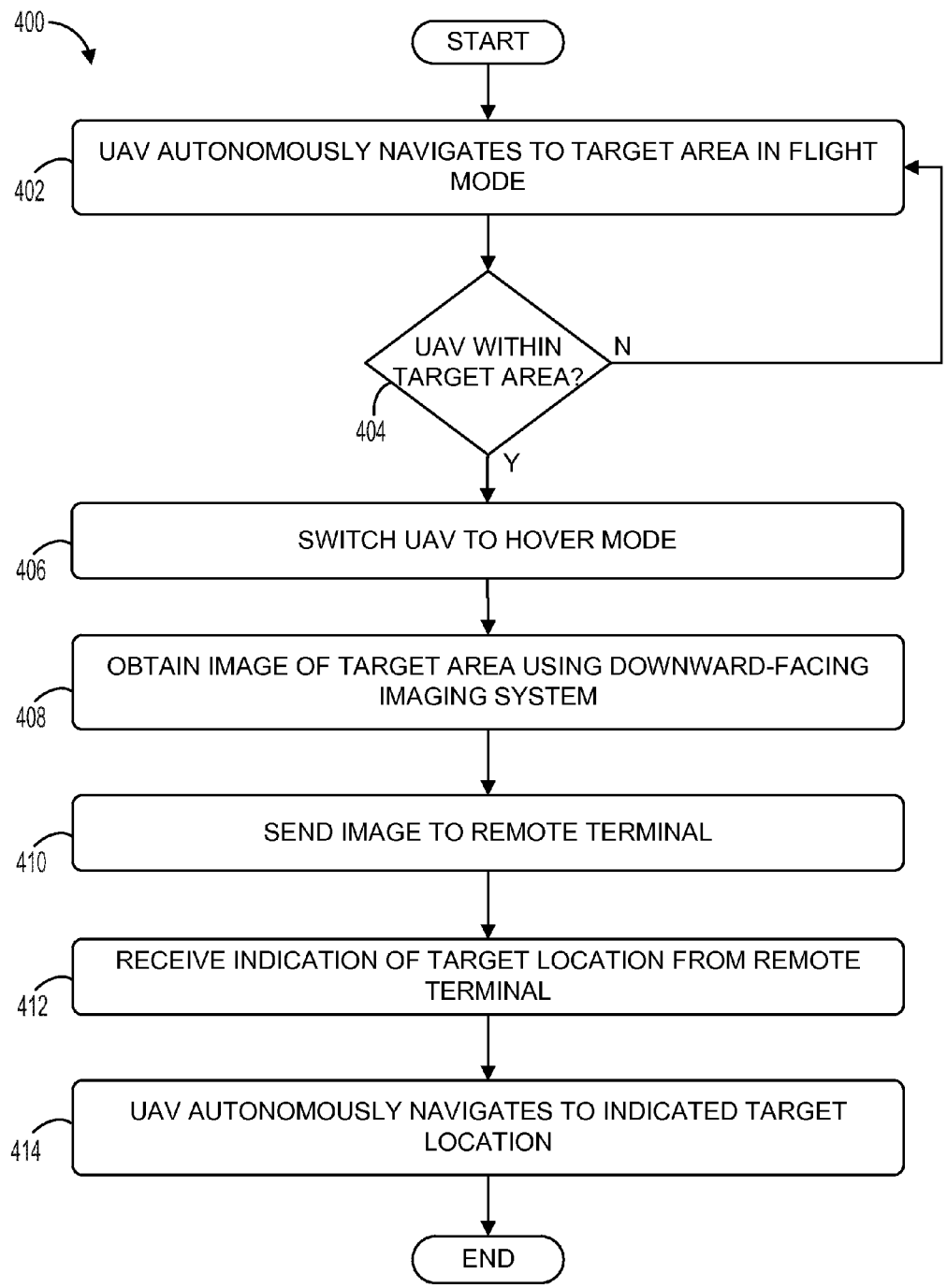
FIG. 4A is flow chart illustrating a process that may be performed by a UAV, according to an example embodiment.

FIG. 4A is flow chart illustrating a process 400 that may be performed by a UAV, according to an example embodiment. For example, the process 400 may be performed by any of the UAVs described herein. At block 402, the UAV may autonomously navigate to a target area while in flight mode. For example, the UAV may autonomously generate a set of flight commands to operate a propulsion system so as to cause the UAV to fly toward a delivery site specified by coordinates. At block 404, the UAV can determine whether it is within the target area. The UAV may determine it is within the target area based on determining it within a threshold distance of a nominal destination coordinate, or based on determining it is within a threshold time of arrival at the nominal destination coordinate. The UAV may also determine it is within the target area based on estimating its location is within a set of boundaries that define the target area—such boundaries may be based, for example, on property lot lines in residential neighborhoods.

If the UAV determines, at block 404, that it is within the target area, the UAV can switch from flight mode to hover mode, at block 406. The UAV switching to hover mode may involve the UAV adjusting its propulsion systems such that the thrust generated thereby changes from having a net translational component to not having a net translational component. At block 408, the UAV can obtain an image of the target area (e.g., the delivery site) using its downward-facing imaging system. The imaging system may be mounted so as to maintain a substantially fixed point of view with respect to an orientation of the UAV, as described in connection with the imaging system 230 in FIGS. 2A-2C. At block 410, the obtained image can be sent to a remote terminal (e.g., via a wireless communication link). In some examples, the UAV may provide a live video stream to the remote terminal. A remote operator at the terminal can then analyze the obtained image and select a target location that is depicted within the image.

At block 412, the UAV receives an indication of a target location from the remote terminal. The indication of the target location may take different forms and may include a set of coordinates for the target location and/or a translational offset to traverse for the UAV to move from its current location to the target location. In some examples, the indication received in block 412 may include an indication of an image coordinate selected by the remote operator, and the UAV can then determine a translational offset that corresponds to the selected image coordinate. For example, a particular selected pixel coordinate (e.g., that depicts a desired delivery location) can be mapped to a two-dimensional vector for the UAV to traverse. The direction and magnitude of the vector to traverse can be based on the current altitude of the UAV and a relationship between the selected image coordinate and an image coordinate that depicts a location immediately below the UAV (e.g., similar to the image center described in connection with FIG. 2). Thus, a given pixel coordinate can be mapped to an offset vector in a coordinate system oriented according to the UAV (e.g., a coordinate grid with x-y components or latitude-longitude components). At block 414, the UAV can autonomously navigate to the target location indicated in block 412. The UAV autonomously navigating the target location may include, for example, traversing a translational offset from the current location of the UAV. In some examples, the UAV can then use a payload delivery system to deliver a payload while hovering in the target location.

Figure 4B:
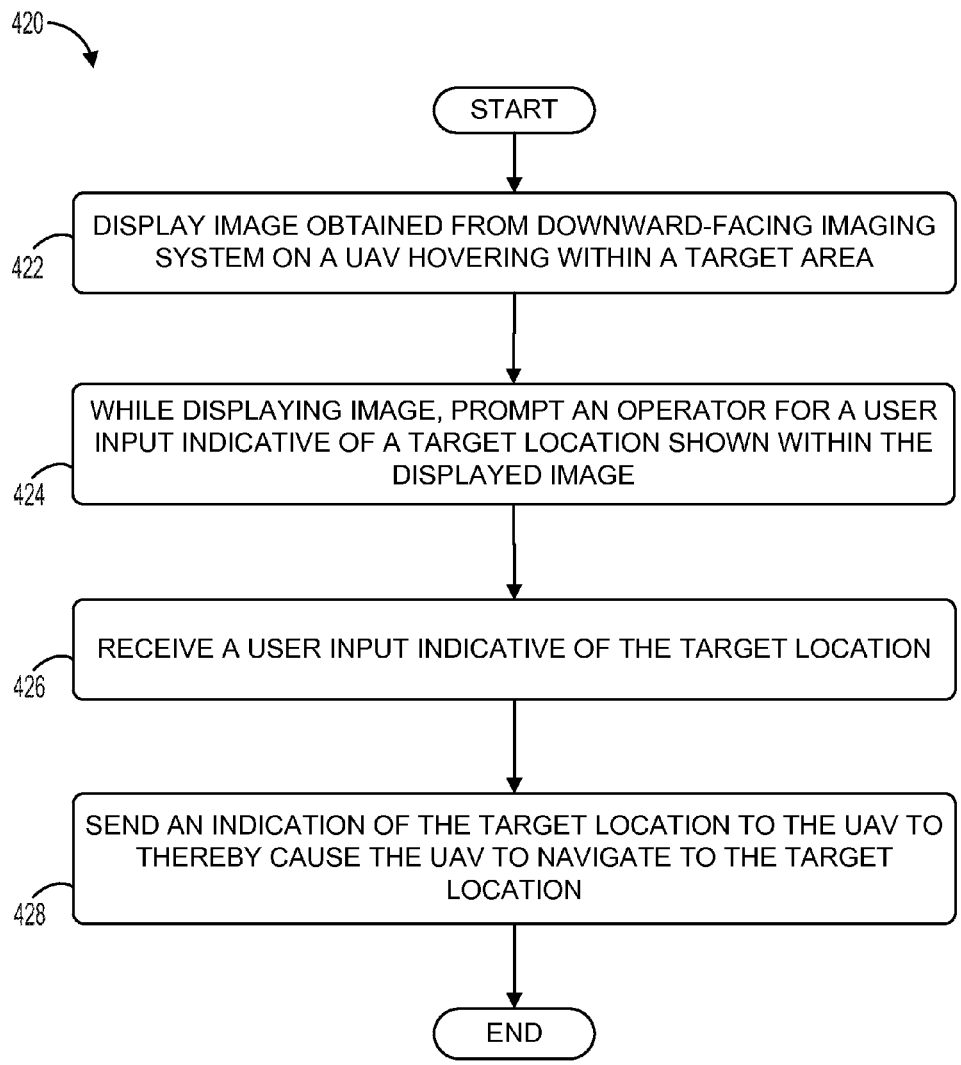
FIG. 4B is a flow chart illustrating a process that may be performed by a remote supervisory control interface, according to an example embodiment.

FIG. 4B is a flow chart illustrating a process 420 that may be performed by a remote supervisory control interface, according to an example embodiment. For example, the process 420 may be performed by the remote terminal 240 (and computing system associated therewith) described in connection with FIGS. 2A-2C. At block 422, the remote terminal may display an image obtained from a downward-facing imaging system on a UAV hovering within a target area. For instance, the UAV may autonomously navigate to the target area, and upon reaching the target area, begin hovering and streaming video of the target area to the remote terminal. The remote terminal can include a user interface with a display that is used to display the received image.

At block 424, while displaying the image, the remote terminal can provide a prompt to a remote operator to provide a user input indicative of a target location depicted within the displayed image. For instance, the remote terminal's user interface may prompt the user using an audio and/or visual cue. In some examples, the prompt may involve the display presenting the obtained image to be viewed by the remote operator or may involve changing colors, highlighting a region depicted in the image, displaying text and/or images that request the operator to provide an input. Other examples are also possible. At block 426, the remote terminal receives a user input indicative of the target location selected by the operator. The user input may be provided via a touchscreen interface, a mouse click or keyboard entry, a verbal command, or another input. Moreover, in some cases the user input may simply be an approval to accept a default target location indicated on the display. Such a default target location may be provided based on, for example, a nominal geographic coordinate for the target area, automated image analysis of the obtained image (e.g., recognition of a porch, a door, stairs, sidewalk, driveway, etc. and selecting a default location based on recognized features). In such examples, the prompt provided at block 424 may involve indicating the default location (e.g., by highlighting the default location on the obtained image) and prompting the remote operator to either accept the default target location or indicate an alternative.

At block 428, the remote terminal can send an indication of the selected target location to the UAV, which thereby causes the UAV to navigate to the target location. For example, the UAV may navigate to the target location by traversing a translational offset specified by a heading and distance as described above.

V. EXAMPLE UAVS

FIGS. 5A, 5B, 5C, and 5D are simplified illustrations of example unmanned aerial vehicles, according to example embodiments. Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

Figure 5A:
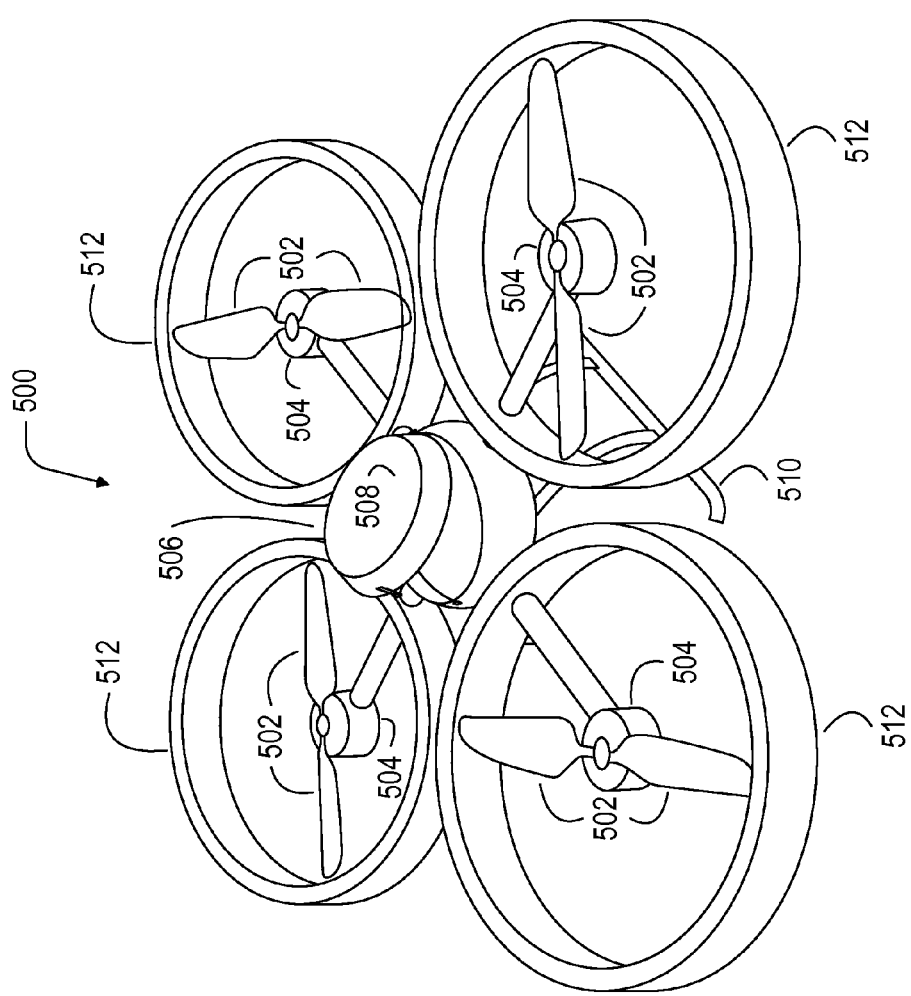
FIGS. 5A, 5B, 5C, and 5D are simplified illustrations of example unmanned aerial vehicles, according to example embodiments.

FIG. 5A is a simplified illustration of a UAV 500, according to an example embodiment. In particular, FIG. 5A shows an example of a rotorcraft 500 that is commonly referred to as a multicopter. Multicopter 500 may also be referred to as a quadcopter, as it includes four rotors 502. It should be understood that example embodiments may involve rotorcraft with more or less rotors than multicopter 500. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 500 in greater detail, the four rotors 502 provide propulsion and maneuverability for the multicopter 500. More specifically, each rotor 502 includes blades that are attached to a motor 504. Configured as such the rotors may allow the multicopter 500 to take off and land vertically, to maneuver in any direction, and/or to hover. Furthermore, the pitch of the blades may be adjusted as a group and/or differentially, and may allow a multicopter 502 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 500. Blade-pitch adjustment may be particularly useful for rotorcraft with substantial inertia in the rotors and/or drive train, but is not limited to such rotorcraft Additionally or alternatively, multicopter 500 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 500 also includes a central enclosure 506 with a hinged lid 508. The central enclosure may house, for example, control electronics such as an inertial measurement unit (IMU) and/or an electronic speed controller, batteries, other sensors, and/or a payload, among other possibilities.

The illustrative multicopter 500 also includes landing gear 510 to assist with controlled take-offs and landings. In other embodiments, multicopters and other types of UAVs without landing gear are also possible.

In a further aspect, multicopter 500 includes rotor protectors 512. Such rotor protectors 512 can serve multiple purposes, such as protecting the rotors 502 from damage if the multicopter 500 strays too close to an object, protecting the multicopter 500 structure from damage, and protecting nearby objects from being damaged by the rotors 502. It should be understood that in other embodiments, multicopters and other types of UAVs without rotor protectors are also possible. Further, rotor protectors of different shapes, sizes, and function are possible, without departing from the scope of the invention.

A multicopter 500 may control the direction and/or speed of its movement by controlling its pitch, roll, yaw, and/or altitude. To do so, multicopter 500 may increase or decrease the speeds at which the rotors 502 spin. For example, by maintaining a constant speed of three rotors 502 and decreasing the speed of a fourth rotor, the multicopter 500 can roll right, roll left, pitch forward, or pitch backward, depending upon which motor has its speed decreased. Specifically, the multicopter may roll in the direction of the motor with the decreased speed. As another example, increasing or decreasing the speed of all rotors 502 simultaneously can result in the multicopter 500 increasing or decreasing its altitude, respectively. As yet another example, increasing or decreasing the speed of rotors 502 that are turning in the same direction can result in the multicopter 500 performing a yaw-left or yaw-right movement. These are but a few examples of the different types of movement that can be accomplished by independently or collectively adjusting the RPM and/or the direction that rotors 502 are spinning.

Figure 5B:
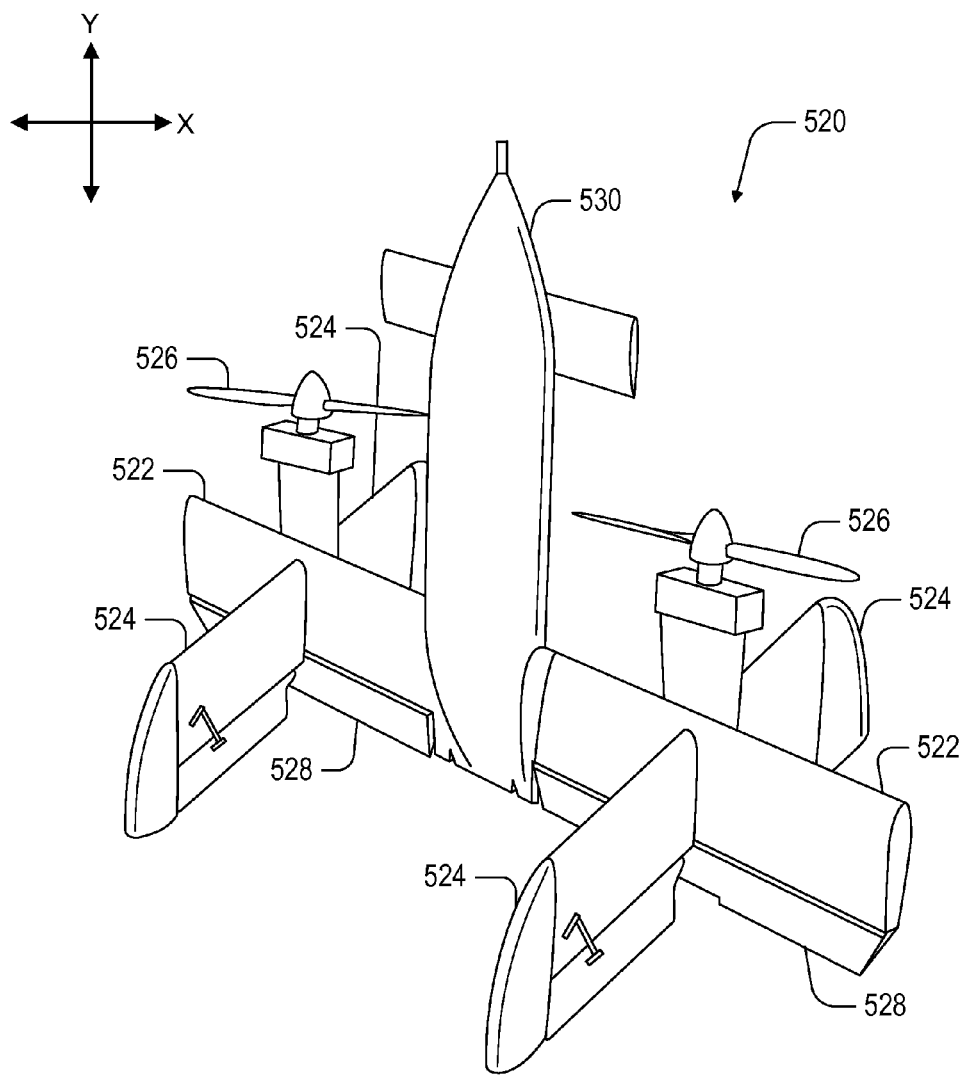

FIG. 5B is a simplified illustration of a UAV 520, according to an example embodiment. In particular, FIG. 5B shows an example of a tail-sitter UAV 520. In the illustrated example, the tail-sitter UAV 520 has fixed wings 522 to provide lift and allow the UAV to glide horizontally (e.g., along the x-axis, in a position that is approximately perpendicular to the position shown in FIG. 5B). However, the fixed wings 522 also allow the tail-sitter UAV 520 take off and land vertically on its own.

For example, at a launch site, tail-sitter UAV 520 may be positioned vertically (as shown) with fins 524 and/or wings 522 resting on the ground and stabilizing the UAV 520 in the vertical position. The tail-sitter UAV 520 may then take off by operating propellers 526 to generate the upward thrust (e.g., a thrust that is generally along the y-axis). Once at a suitable altitude, the tail-sitter UAV 520 may use its flaps 528 to reorient itself in a horizontal position, such that the fuselage 530 is closer to being aligned with the x-axis than the y-axis (e.g., aligned parallel to the ground). Positioned horizontally, the propellers 526 may provide forward thrust so that the tail-sitter UAV 520 can fly in a similar manner as a typical airplane.

Variations on the illustrated tail-sitter UAV 520 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 520 are also possible.

As noted above, some embodiments may involve other types of UAVs, in addition or in the alternative to multi-copters. For instance, FIGS. 5C and 5D are simplified illustrations of other types of UAVs, according to example embodiments.

Figure 5C:
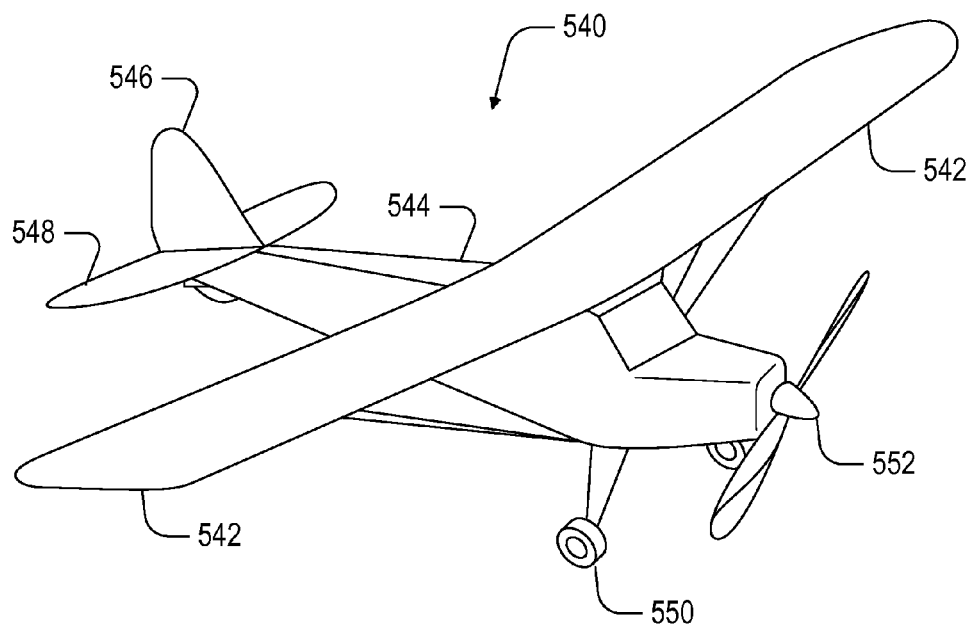

In particular, FIG. 5C shows an example of a fixed-wing aircraft 540, which may also be referred to as an airplane, an aeroplane, or simply a plane. A fixed-wing aircraft 540, as the name implies, has stationary wings 542 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 5C depicts some common structures used in a fixed-wing aircraft 540. In particular, fixed-wing aircraft 540 includes a fuselage 544, two horizontal wings 542 with an airfoil-shaped cross section to produce an aerodynamic force, a vertical stabilizer 546 (or fin) to stabilize the plane's yaw (turn left or right), a horizontal stabilizer 548 (also referred to as an elevator or tailplane) to stabilize pitch (tilt up or down), landing gear 550, and a propulsion unit 552, which can include a motor, shaft, and propeller.

Figure 5D:
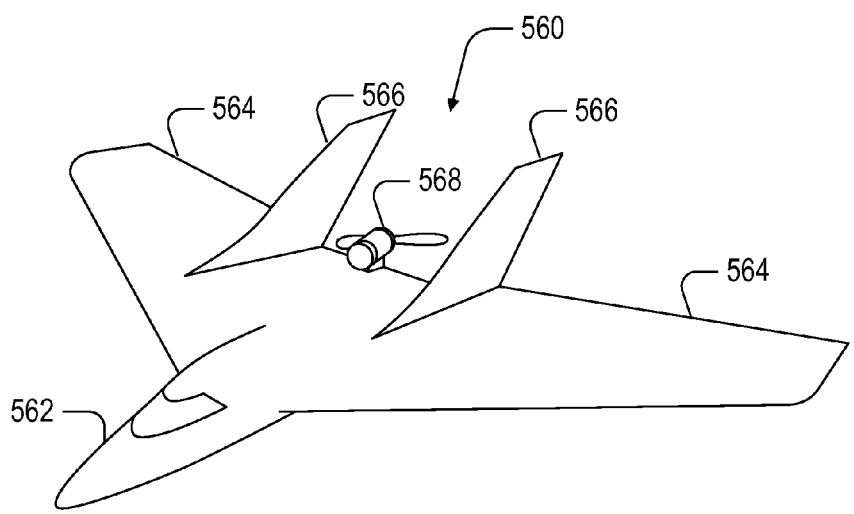

FIG. 5D shows an example of an aircraft 560 with a propeller in a pusher configuration. The term "pusher" refers to the fact that the propulsion unit 568 is mounted at the back of the aircraft and "pushes" the vehicle forward, in contrast to the propulsion unit being mounted at the front of the aircraft. Similar to the description provided for FIG. 5C, FIG. 5D depicts common structures used in the pusher plane: a fuselage 562, two horizontal wings 564, vertical stabilizers 566, and a propulsion unit 568, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

VI. EXAMPLE COMPONENTS OF A UAV

Figure 6:
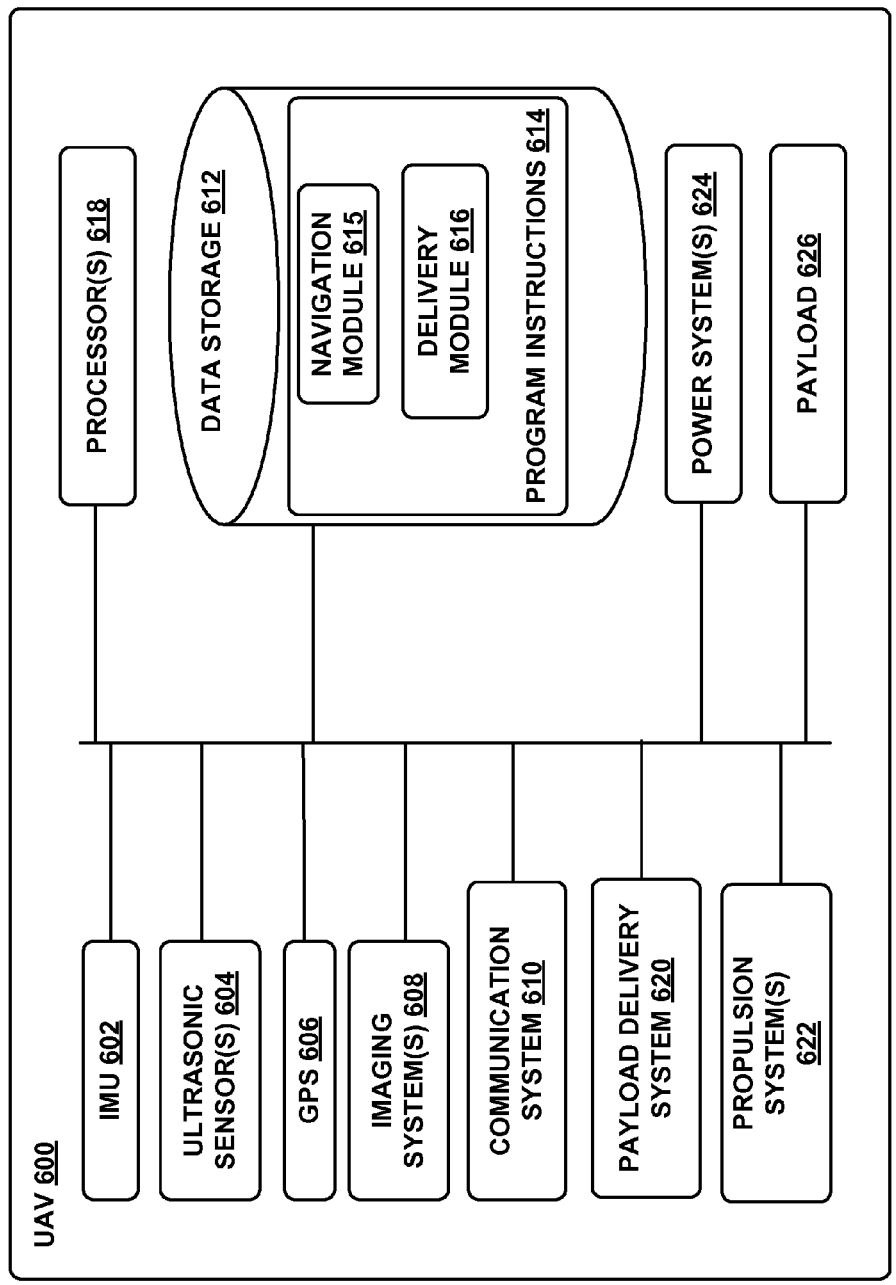
FIG. 6 is a simplified block diagram illustrating components of a UAV, according to an example embodiment.

FIG. 6 is a simplified block diagram illustrating components of a UAV 600, according to an example embodiment. UAV 600 may take the form of or be similar in form to one of the UAVs 500, 520, 540, and 560 shown in FIGS. 5A-5D. However, a UAV 600 may also take other forms.

UAV 600 may include various types of sensors, and may include a computing system configured to provide the functionality described herein. In the illustrated embodiment, the sensors of UAV 600 include an inertial measurement unit (IMU) 602, ultrasonic sensor(s) 604, GPS 606, imaging system(s) 608, among other possible sensors and sensing systems. The UAV 600 also includes a communication system 610, a payload delivery system 620, and propulsion system(s) 622.

The UAV 600 can include one or more processors 618. The processor(s) 618 may include a general-purpose processor or a special purpose processor (e.g., digital signal processors, application specific integrated circuits, etc.). The one or more processors 618 can be configured to execute computer-readable program instructions 614 that are stored in the data storage 612 and are executable to provide the functionality of a UAV described herein.

The data storage 612 may include or take the form of one or more computer-readable storage media that can be read or accessed by at least one processor 618. The one or more computer-readable storage media can include volatile and/or non-volatile storage components, such as optical, magnetic, organic or other memory or disc storage, which can be integrated in whole or in part with at least one of the one or more processors 618. In some embodiments, the data storage 612 can be implemented using a single physical device (e.g., one optical, magnetic, organic or other memory or disc storage unit), while in other embodiments, the data storage 612 can be implemented using two or more physical devices.

As noted, the data storage 612 can include computer-readable program instructions 614 and perhaps additional data, such as diagnostic data of the UAV 600. The program instructions 614 may be configured to cause the UAV 600 to perform or facilitate some or all of the UAV functionality described herein. For instance, in the illustrated embodiment, program instructions 614 include a navigation module 615 and an automated delivery module 616. The navigation module 615 can be a set of program instructions that, when executed by the processor(s) 618, generate flight commands to operate the propulsion system(s) 622 so as to cause the UAV 600 to navigate to a particular location and/or along a particular flight path. The delivery module 616 can be a set of program instructions that, when executed by the processor(s) 618, operate the payload delivery system 620 to lower a payload to the ground and release the payload. The delivery module 616 may also function to cause the UAV

600 to receive communication(s) from a remote operator indicative of a particular target location at which to deliver the payload and/or an authorization to initiate delivery and/or retraction of the payload delivery system 620. Other functions are also possible, including functions of the UAVs and payload delivery systems described above in connection with FIGS. 1-4.

A. Sensors

In an illustrative embodiment, IMU 602 may include both an accelerometer and a gyroscope, which may be used together to determine the orientation, position, and/or elevation of the UAV 600. In particular, the accelerometer can measure the orientation of the UAV 600 with respect to earth, while the gyroscope measures the rate of rotation around an axis. IMUs are commercially available in low-cost, low-power packages. For instance, an IMU 602 may take the form of or include a miniaturized MicroElectroMechanical System (MEMS) or a NanoElectroMechanical System (NEMS). Other types of IMUs may also be utilized.

An IMU 602 may include other sensors, in addition to accelerometers and gyroscopes, which may help to better determine position and/or help to increase autonomy of the UAV 600. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 600, slight errors in measurement may compound over time and result in a more significant error. However, an example UAV 600 may be able mitigate or reduce such errors by using a magnetometer to measure direction. One example of a magnetometer is a low-power, digital 3-axis magnetometer, which can be used to realize an orientation independent electronic compass for accurate heading information based on the Earth's magnetic field. However, other types of magnetometers may be utilized as well.

UAV 600 may also include a pressure sensor or barometer, which can be used to determine the altitude of the UAV 600. Alternatively, other sensors, such as sonic altimeters or radar altimeters, can be used to provide an indication of altitude, which may help to improve the accuracy of and/or prevent drift of an IMU.

In a further aspect, UAV 600 may include one or more sensors that allow the UAV to sense objects in the environment. For instance, in the illustrated embodiment, UAV 600 includes ultrasonic sensor(s) 604. Ultrasonic sensor(s) 604 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 600 also includes a GPS receiver 606. The GPS receiver 606 may be configured to provide data that is typical of well-known GPS systems, such as the GPS coordinates of the UAV 600. Such GPS data may be utilized by the UAV 600 for various functions. For example, the UAV 600 may use its GPS receiver 606 to help navigate to a target GPS location. In some scenarios a target GPS location may be based in part on a database that associates GPS coordinates with street addresses or may be based in part on GPS coordinates obtained from a mobile device. Other examples are also possible.

UAV 500 may also include one or more imaging system(s) 608. For example, one or more still and/or video cameras may be utilized by a UAV 600 to capture image data from the UAV's environment. As a specific example, charge-coupled device (CCD) cameras or complementary metal-oxide-semiconductor (CMOS) cameras can be used with unmanned vehicles. Such imaging sensor(s) 608 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system 608 to help in determining location. For example, UAV 600 may capture imagery of its environment and compare it to what it expects to see in its environment given current estimated position (e.g., its current GPS coordinates), and refine its estimate of its position based on this comparison.

In some examples, the imaging system 608 may be mounted to the UAV 600 with a mounting system that substantially fixes a point of view of the imaging system with respect to an orientation of the UAV 600. For example, the imaging system 608 may be mounted via a three-dimensional gimbal mount system that stabilizes the point of view of the imaging system (e.g., downward-facing and with a given direction of the image oriented along a fixed direction of the UAV).

In a further aspect, UAV 600 may include one or more microphones. Such microphones may be configured to capture sound from the UAVs environment. Other environmental sensors are also possible.

B. Navigation and Location Determination

The navigation module 615 may provide functionality that allows the UAV 600 to, e.g., move about in its environment and reach a desired location. To do so, the navigation module 615 may control the altitude and/or direction of flight by controlling the mechanical features of the UAV that affect flight (e.g., rotors 502 of UAV 500).

In order to navigate the UAV 600 to a target location, a navigation module 615 may implement various navigation techniques, such as map-based navigation and localization-based navigation, for instance. With map-based navigation, the UAV 600 may be provided with a map of its environment, which may then be used to navigate to a particular location on the map. With localization-based navigation, the UAV 600 may be capable of navigating in an unknown environment using localization. Localization-based navigation may involve a UAV 600 building its own map of its environment and calculating its position within the map and/or the position of objects in the environment. For example, as a UAV 600 moves throughout its environment, the UAV 600 may continuously use localization to update its map of the environment. This continuous mapping process may be referred to as simultaneous localization and mapping (SLAM). Other navigation techniques may also be utilized.

In some embodiments, the navigation module 615 may navigate using a technique that relies on waypoints. In particular, waypoints are sets of coordinates that identify points in physical space. For instance, an air-navigation waypoint may be defined by a certain latitude, longitude, and altitude. Accordingly, navigation module 615 may cause UAV 600 to move from waypoint to waypoint, in order to ultimately travel to a final destination (e.g., a final waypoint in a sequence of waypoints).

In a further aspect, navigation module 615 and/or other components and systems of UAV 600 may be configured for "localization" to more precisely navigate to the scene of a medical situation. More specifically, it may be desirable in certain situations for a UAV to be close to the person in need of medical support (e.g., within reach of the person), so as to properly provide medical support to the person. To this end, the UAV 600 may use a two-tiered approach in which it uses a more-general location-determination technique to navigate to a target area, and then use a more-refined location-determination technique to identify and/or navigate to the target location within the target area.

For example, the UAV 600 may navigate to a general target area (i.e., an approximate target location) based on GPS coordinates provided by a delivery control system that provides an approximate target location associated with a given street address. The UAV 600 may then autonomously navigate to the target area. Upon arrival within the target area, the UAV 600 can transition to a hover mode and begin sending image data (e.g., streaming video) obtained with the imaging system 608 to a remote operator. The image data can provide an aerial view of the target area that can be displayed for analysis by the remote operator. The remote operator can then provide a user input to indicate a target location that is depicted within the target area. The user input may indicate an image coordinate on the displayed image of the target area, for example. The UAV 600 can receive an indication of the indicated target location, and can autonomously traverse an offset to arrive at the target location. The direction and distance of the offset to be traversed may be based on the remote operator's user input and a substantially fixed spatial relationship between the point of view of the imaging system 608 and the orientation of the UAV 600. By causing the UAV 600 to navigate to the precise target location indicated by the remote operator, the UAV 600 can arrive at a location that is more accurately specified than typically feasible by GPS coordinates alone, which may be accurate to a scale of several meters, or perhaps tens of meters. In addition, the UAV 600 can be positioned at a target location that is deemed desirable by a remote operator based on real time aerial image data of the target location provided by UAV's imaging system 608.

Various types of location-determination techniques may be used to accomplish localization and/or selection of a target location once a UAV 600 has navigated to the general target area. For instance, a UAV 600 may be equipped with one or more sensory systems, such as, for example, imaging system(s) 608, a directional microphone array (not shown), ultrasonic sensors 604, infrared sensors (not shown), and/or other sensors, which may provide input that the navigation module 615 utilizes to navigate autonomously or semi-autonomously to the target location that is specified at least in part by a user input from a remote operator.

As another example, once the UAV 600 reaches the general target area, the UAV 600 may switch to a "fly-by-wire" mode where it is controlled, at least in part, by a remote operator, who can navigate the UAV 600 to a specific target location. To this end, sensory data from the UAV 600 may be sent to the remote operator to assist them in navigating the UAV 600 to the specific target location. For example, the UAV 600 may stream a video feed or a sequence of still images from the UAV's imaging system(s) 608, as well as avionics information such as altimeter data, pitch/roll information, and/or bearing information. Other examples are possible.

In an alternative arrangement, a navigation module may be implemented at a remote computing device (e.g., a computing device associated with a remote operator), which communicates wirelessly with the UAV 600. The remote computing device may receive data indicating the operational state of the UAV 600, sensor data from the UAV 600 that allows it to assess the environmental conditions being experienced by the UAV 600, and/or location information for the UAV 600. Provided with such information, the remote computing device may determine latitudinal and/or directional adjustments that should be made by the UAV 600 and/or may determine how the UAV should adjust its mechanical features (e.g., rotors 502 of UAV 500) in order to effectuate such movements. The remote computing system may then communicate such adjustments to the UAV 600 so it can move in the determined manner. Such commands to the electromechanical propulsion systems 622 of the UAV 600 may be referred to herein as flight-control commands, whether generated by a remote computing system or by the navigation module 615 on the UAV 600.

C. Payload Delivery

The payload delivery module 616 may provide functionality that allows the UAV 600 to autonomously or semi-autonomously lower a payload to the ground and release the payload, thereby effecting delivery of the payload on the ground. In practice, the payload delivery module 616 may be a set of program instructions that generates commands to electromechanical components and/or control systems of the payload delivery system 620 (e.g., the payload delivery system 110 of UAV 100).

The payload delivery system 620 may include aspects that selectively secure and release a payload (e.g., the payload-release mechanism 106), and that selectively lower the payload to the ground (e.g., the tether-deployment mechanism 104 and tether 102). In some cases, the payload may be lowered to the ground using a retractable payload-release mechanism that is secured to the payload and that includes sensors to facilitate monitoring of the payload as it descends from the UAV 600. The payload-release mechanism may, for example, communicate information from an inertial measurement unit and/or altimeter via a wireless connection with the UAV 600. Data from such sensors on the payload-release mechanism can then be used by the payload delivery module 616 to determine when the payload and/or the payload-release mechanism have reached the ground (e.g., based on accelerometer data consistent with an impact with the ground). Data from the sensors can also be used to determine whether the payload, payload-release mechanism, and/or tether may have become stuck in an obstacle such as a tree or fence, or otherwise interfered with by a vehicle or perhaps a pedestrian.

Other functionality of the payload delivery system 620 (and the payload delivery module 616) may include functions of the payload delivery system 110 described above in connection with FIGS. 1-2.

D. Communication Systems

In a further aspect, UAV 600 includes one or more communication systems 610. The communications systems 610 may include one or more wireless interfaces and/or one or more wireline interfaces, which allow UAV 600 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 600 may include communication systems 610 that allow for both short-range communication and long-range communication. For example, the UAV 600 may be configured for short-range communications using Bluetooth and for long-range communications under a CDMA protocol. In such an embodiment, the UAV 600 may be configured to function as a "hot spot;" or in other words, as a gateway or proxy between a remote support device and one or more data networks, such as cellular network and/or the Internet. Configured as such, the UAV 600 may facilitate data communications that the remote support device would otherwise be unable to perform by itself.

For example, UAV 600 may provide a WiFi connection to a remote device, and serve as a proxy or gateway to a cellular service provider's data network, which the UAV 600 might connect to under an LTE or a 3G protocol, for instance. The UAV 600 could also serve as a proxy or gateway to a high-altitude balloon network, a satellite network, or a combination of these networks, among others, which a remote device might not be able to otherwise access.

E. Power Systems

In a further aspect, UAV 600 may include power system(s) 624. A power system 624 may include one or more batteries for providing power to the UAV 600. In one example, the one or more batteries may be rechargeable and each battery may be recharged via a wired connection between the battery and a power supply and/or via a wireless charging system, such as an inductive charging system that applies an external time-varying magnetic field to an internal battery.

F. Payloads

UAV 600 may employ various systems and configurations in order to transport items. In the illustrated embodiment, a payload 626 may serve as a compartment that can hold one or more items, such that a UAV 600 can deliver the one or more items to a target delivery location. For example, as shown in FIG. 5A, the UAV 500 can include a compartment 508, in which an item or items may be transported. As another example, the UAV 600 can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible. In some implementations, the payload 626 of a given UAV 600 may include or take the form of a "package" designed to transport medical-support items to a target delivery location. For example, a medical-support UAV may include a package with one or more items for medical support in the particular medical situation, and/or one or more medical-support modules that are designed to provide medical support in the particular medical situation. In some cases, a UAV 600 may include a package that is designed for a particular medical situation such as choking, cardiac arrest, shock, asthma, drowning, etc. In other cases, a UAV 600 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 624 for power.

In some embodiments, UAV 600 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, UAV 600 might function as a mobile defibrillator. Specifically, rather than carry a stand-alone defibrillator that can then be removed from the UAV for use, the UAV itself may function as a defibrillator.

G. Service Modules

As noted above, UAV 600 may include one or more service modules. The one or more service modules may include software, firmware, and/or hardware that may help to provide or assist in the provision of the UAV-related services. In some examples, the one or more service modules described herein may be implemented, at least in part, by the program instructions 614 configured to be executed by the processor(s) 618.

Configured as such, a UAV 600 may provide various types of service. For instance, the UAV 600 may have stored information that can be provided to a person or persons at the target location, in order to assist the person or persons in various ways. For example, the UAV 600 may include a video or audio file with instructions for performing some task, which the UAV 600 can play out to a person at the target location. As another example, the UAV 600 may include an interactive program to assist a person at the target location in performing some task. For instance, the UAV 600 may include an application that analyzes the person's speech to detect questions related to the medical situation and/or that provides a text-based interface via which the person can ask such questions, and then determines and provides answers to such questions.

In some embodiments, UAV 600 may facilitate communication between a layperson and/or medical personnel at the scene and medical personnel at a remote location. As an example, a service module may provide a user interface via which a person at the scene can use a communication system 610 of the UAV to communicate with an emergency medical technician at a remote location. As another example, the UAV 600 can unlock certain capabilities of a remote device, such as a mobile phone, which is near the UAV 600 at the scene of a medical situation. Such capabilities may be inaccessible to a user of the remote device, unless the remote device is within a certain distance from the UAV 600 such that the UAV 600 can unlock the capabilities. For example, the UAV 600 may send the remote device a security key that allows the remote device to establish a secure connection to communicate with medical personnel at a remote location. Other examples are also possible.

VII. EXAMPLE UAV SYSTEMS

Figure 7:
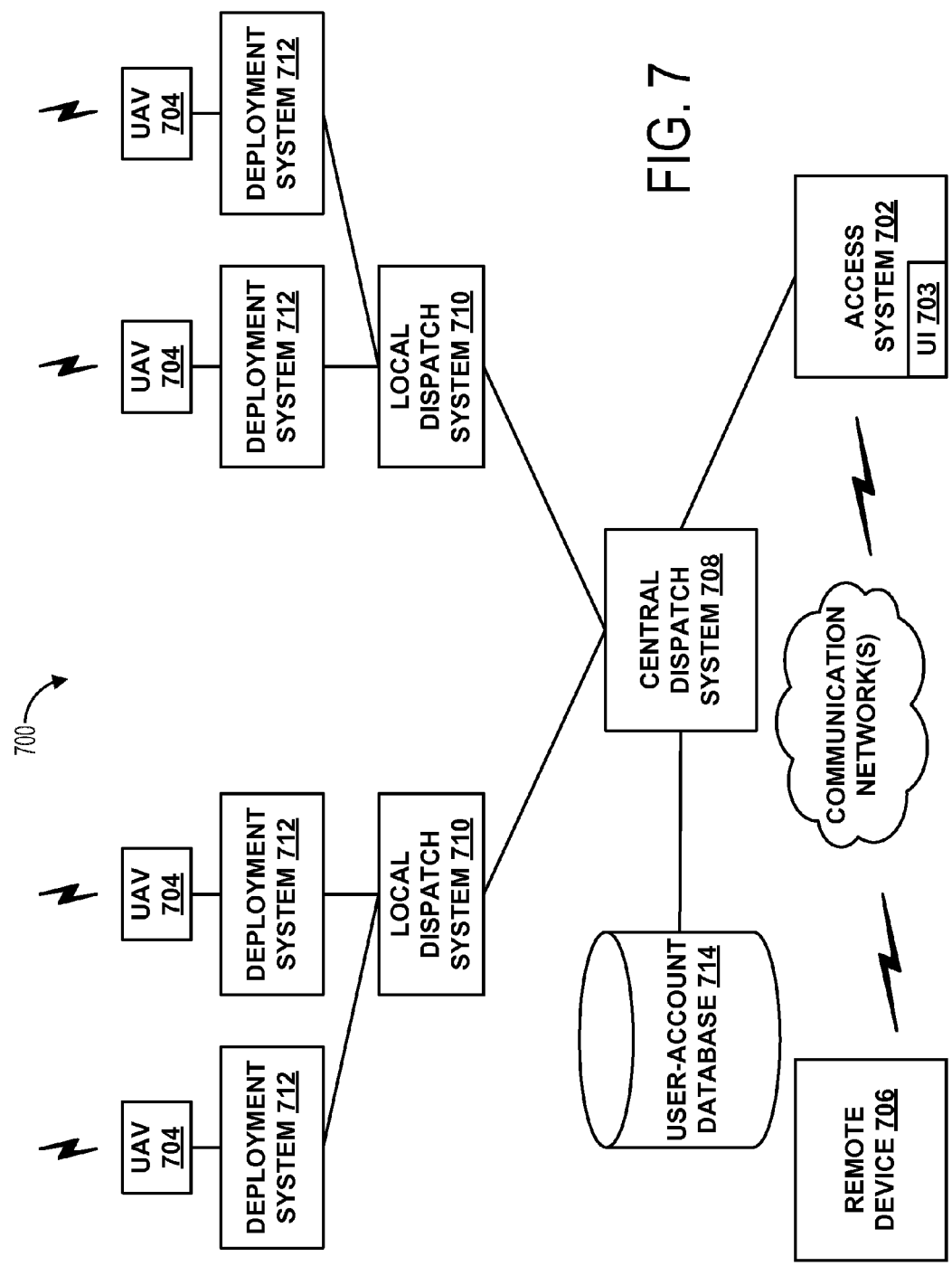
FIG. 7 is a simplified block diagram illustrating a distributed UAV system, according to an example embodiment.

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 7 is a simplified block diagram illustrating a distributed UAV system 700, according to an example embodiment.

In an example UAV system 700, an access system 702 may allow for interaction with, control of, and/or utilization of a network of UAVs 704. In some embodiments, an access system 702 may be a computing system that allows for human-controlled dispatch of UAVs 704. As such, the control system may include or otherwise provide a user interface (UI) 703 via which a user can access and/or control UAVs 704. In some embodiments, dispatch of UAVs 704 may additionally or alternatively be accomplished via one or more automated processes. The access system 702 and associated UI 703 that allow for human-controlled dispatch may be implemented, for example, using a remote terminal similar to the remote terminal 240 for supervisory control described in connection with FIG. 2.

Further, the access system 702 may provide for remote operation of a UAV. For instance, an access system 702 may allow an operator to control the flight of a UAV 704 via user interface 703. As a specific example, an operator may use an access system to dispatch a UAV 704 to deliver a package to a target location, or to travel to the location of a medical situation with medical-support items. The UAV 704 may then autonomously navigate to the general area of the target location. At this point, the operator may use the access system 702 to take over control of the UAV 704, and navigate the UAV to the target location (e.g., to a particular person to whom a payload is being sent). Other examples of remote operation of the UAV 704 are also possible.

The UAVs 704 may take various forms. For example, each UAV 704 may be a UAV such as those illustrated in FIGS. 5A-5D. However, UAV system 700 may also utilize other types of UAVs without departing from the scope of the present disclosure. In some implementations, all UAVs 704 may be of the same or a similar configuration. However, in other implementations, UAVs 704 may include a number of different types of UAVs. For instance, UAVs 704 may include a number of types of UAVs, with each type of UAV being configured for a different type or types of medical support.

A remote device 706 may take various forms. Generally, a remote device 706 may be any device via which a direct or indirect request to dispatch UAV 704 can be made. (Note that an indirect request may involve any communication that may be responded to by dispatching a UAV; e.g., requesting a payload delivery, or sending a request for medical support). In an example embodiment, a remote device 706 may be a mobile phone, tablet computer, laptop computer, personal computer, or any network-connected computing device. Further, in some instances, remote device 706 may not be a computing device. As an example, a standard telephone, which allows for communication via plain old telephone service (POTS), may serve as a remote device 706. Other types of remote devices are also possible.

Further, a remote device 706 may be configured to communicate with access system 702 via one or more types of communication network(s). For example, a remote device 706 could communicate with access system 702 (or via a human operator of the access system) by placing a phone call over a POTS network, a cellular network, and/or a data network such as the Internet. Other types of networks may also be utilized.

In some embodiments, a remote device 706 may be configured to allow a user to request delivery of one or more items to a desired location. For example, a user could request UAV delivery of a payload to their home via their mobile phone, tablet, or laptop. As another example, a user could request dynamic delivery to whatever location they are at at the time of delivery. To provide such dynamic delivery, the UAV system 700 may receive location information (e.g., GPS coordinates, etc.) from the user's mobile phone, or any other device on the user's person, such that the UAV 704 can navigate to the user's location (as indicated by their mobile phone).

In an example arrangement, central dispatch system 708 may be a server or group of servers, which is configured to receive dispatch messages requests and/or dispatch instructions from an access system 702. Such dispatch messages may request or instruct the central dispatch system 708 to coordinate the deployment of UAVs to various target locations. A central dispatch system 708 may be further configured to route such requests or instructions to local dispatch systems 710. To provide such functionality, central dispatch system 708 may communicate with access system 702 via a data network, such as the Internet or a private network that is established for communications between access systems and automated dispatch systems.

In the illustrated configuration, central dispatch system 708 may be configured to coordinate the dispatch of UAVs 704 from a number of different local dispatch systems 710. As such, central dispatch system 708 may keep track of which UAVs 704 are located at which local dispatch systems 710, which UAVs 704 are currently available for deployment, and/or which services or operations each of the UAVs 704 is configured for (in the event that a UAV fleet includes multiple types of UAVs configured for different services and/or operations). Additionally or alternatively, each local dispatch system 710 may be configured to track which of its associated UAVs 704 are currently available for deployment and/or which services or operations each of its associated UAVs is configured for.

In some cases, when central dispatch system 708 receives a request for UAV-related service from an access system 702, central dispatch system 708 may select a specific UAV 704 to dispatch. The central dispatch system 708 may accordingly instruct the local dispatch system 710 that is associated with the selected UAV to dispatch the selected UAV. The local dispatch system 710 may then operate its associated deployment system 712 to launch the selected UAV. In other cases, a central dispatch system 708 may forward a request for a UAV-related service to a local dispatch system 710 that is near the location where the support is requested, and leave the selection of a particular UAV 704 to the local dispatch system 710.

In an example configuration, a local dispatch system 710 may be implemented in a computing system at the same location as the deployment system or systems 712 that it controls. For example, in some embodiments, a local dispatch system 710 could be implemented by a computing system at a building, such as a fire station, where the deployment systems 712 and UAVs 704 that are associated with the particular local dispatch system 710 are also located. In other embodiments, a local dispatch system 710 could be implemented at a location that is remote to its associated deployment systems 712 and UAVs 704.

Numerous variations on and alternatives to the illustrated configuration of UAV system 700 are possible. For example, in some embodiments, a user of a remote device 706 could request medical support directly from a central dispatch system 708. To do so, an application may be implemented on a remote device 706 that allows the user to provide information regarding a requested service, and generate and send a data message to request that the UAV system provide the service. In such an embodiment, central dispatch system 708 may include automated functionality to handle requests that are generated by such an application, evaluate such requests, and, if appropriate, coordinate with an appropriate local dispatch system 710 to deploy a UAV.

Further, in some implementations, some or all of the functionality that is attributed herein to central dispatch system 708, local dispatch system(s) 710, access system 702, and/or deployment system(s) 712 could be combined in a single system, implemented in a more complex system, and/or redistributed among central dispatch system 708, local dispatch system(s) 710, access system 702, and/or deployment system(s) 712 in various ways.

Yet further, while each local dispatch system 710 is shown as having two associated deployment systems, a given local dispatch system 710 may have more or less associated deployment systems. Similarly, while central dispatch system 708 is shown as being in communication with two local dispatch systems 710, a central dispatch system may be in communication with more or less local dispatch systems 710.

In a further aspect, a deployment system 712 may take various forms. In general, a deployment system may take the form of or include a system for physically launching a UAV 704. Such a launch system may include features that allow for a human-assisted UAV launch and/or features that provide for an automated UAV launch. Further, a deployment system 712 may be configured to launch one particular UAV 704, or to launch multiple UAVs 704.

A deployment system 712 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 712 and their corresponding UAVs 704 (and possibly associated local dispatch systems 710) may be strategically distributed throughout an area such as a city. For example, deployment systems 712 may be located on the roofs of certain municipal buildings, such as fire stations, which can thus serve as the dispatch locations for UAVs 704. Fire stations may function well for UAV dispatch, as fire stations tend to be distributed well with respect to population density, their roofs tend to be flat, and the use of firehouse roofs as leased spaces for UAV dispatch could further the public good. However, deployment systems 712 (and possibly the local dispatch systems 710) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 700 may include or have access to a user-account database 714. The user-account database 714 may include data for a number of user-accounts, which are each associated with one or more persons. For a given user-account, the user-account database 714 may include data related to or useful in providing UAV-related services. For example, the user-account database 714 may store data indicative of preferred delivery locations and/or other preferences for various delivery street addresses. Indications of those preferences may then be displayed via the UI 703 while a remote operator selects a delivery location, similar to the description provided above in connection with FIG. 2. Typically, the user data associated with each user-account is optionally provided by an associated user and/or is collected with the associated user's permission.

Further, in some embodiments, a person may have to register for a user-account with the UAV system 700 in order to use or be provided with UAV-related services by the UAVs 704 of UAV system 700. As such, the user-account database 714 may include authorization information for a given user-account (e.g., a user-name and password), and/or other information that may be used to authorize access to a user-account.

In some embodiments, a person may associate one or more of their devices with their user-account, such that they can be provided with access to the services of UAV system 700. For example, when a person uses an associated mobile phone to, e.g., place a call to an operator of access system 702 or send a message requesting a UAV-related service to a dispatch system, the phone may be identified via a unique device identification number, and the call or message may then be attributed to the associated user-account. Other examples are also possible.

VIII. CONCLUSION

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An unmanned aerial vehicle (UAV) comprising:
   an image capture system;
   a communication system configured for wireless communications; and
   a control system configured to:
   use output from a navigation module to autonomously navigate the UAV in a forward-flight mode to a target area;
   in response to determining that the UAV is located in the target area: (i) operate the UAV in a hover mode, (ii) operate the image capture system to capture image data of at least a portion of the target area, and (iii) operate the communication system to send a first data communication based on the captured image data, wherein the first data communication is directed to a remote terminal;
   receive, in response to the first data communication, a second data communication comprising an indication of a target location within the target area;
   use a first image coordinate associated with the received indication of the target location, a second image coordinate associated with a point of view of the image capture system, and a current elevation of the UAV as a basis to determine a translational offset to the target location relative to a current location of the UAV;
   determine flight-control commands to navigate the UAV from a current location within the target area to the target location within the target area, wherein the flight-control commands include one or more commands to cause the UAV to traverse the determined translational offset in hover mode; and
   cause the UAV to navigate, in hover mode, to the target location in accordance with the determined flight-control commands.

2. The UAV of claim 1, wherein the first and second image coordinates are each associated with pixel coordinates within the image data of the target area.

3. The UAV of claim 1, wherein the control system determining the translational offset comprises the control system: (i) determining an orientation of the translational offset based on a position of the first image coordinate with respect to the second image coordinate, and (ii) determining a magnitude of the translational offset based on a displacement between the first and second image coordinates and the current elevation.

4. The UAV of claim 1, wherein the image capture system is a downward-facing image capture system mounted on the UAV via a gimbal mount.

5. The UAV of claim 1, further comprising a retractable delivery system comprising: (i) a delivery device configured to selectively secure a payload and release the payload, (ii) a tether coupled to the delivery device, and (iii) a retraction system configured to apply force on the tether while the delivery device is suspended from the UAV by the tether so as to alternately lower the delivery device from the UAV and retract the delivery device back to the UAV, and
   wherein the control system is further configured to, in response to causing the UAV to fly to the target location, use the retractable delivery system to lower the payload to ground level and release the payload at ground level.

6. The UAV of claim 5, wherein the control system is further configured to, prior to using the retractable delivery system to lower and release the payload at ground level: (i) send, to the remote terminal, a third data communication comprising an indication that the UAV is hovering at the target location, and (ii) receive, from the remote terminal, a fourth data communication comprising an authorization to initiate delivery.

7. The UAV of claim 5, wherein the control system is further configured to:
   receive, from the remote terminal, a communication comprising authorization to retract the delivery device to the UAV; and
   in response to receiving the authorization to retract, use the retractable delivery system to initiate retraction of the delivery device to the UAV.

8. The UAV of claim 5, wherein the control system is further configured to:
   receive, from the remote terminal, a third data communication comprising an indication of a position adjustment for the UAV so as to account for a wind-induced movement of the delivery device while the delivery device is suspended from the UAV by the tether; and
   cause the UAV to navigate, in hover mode, in accordance with the indicated position adjustment.

9. The UAV of claim 1, wherein the second data communication was generated by the remote terminal, wherein the indication of the target location was generated by the remote terminal based on the first data communication, and wherein the target location is indicated within the image data of the target area.

10. A method comprising:
    causing an unmanned aerial vehicle (UAV) to navigate, in a forward-flight mode, to a target area;
    in response to determining that the UAV is located in the target area: (i) operating the UAV in a hover mode, (ii) operating an image capture system to capture image data of at least a portion of the target area, and (iii) sending a first data communication based on the captured image data, wherein the first data communication is directed to a remote terminal;

in response to the first data communication, receiving a second data communication comprising an indication of a target location within the target area;

using a first image coordinate associated with the received indication of the target location, a second image coordinate associated with a point of view of the image capture system, and a current elevation of the UAV as a basis for determining a translational offset to the target location relative to a current location of the UAV;

determining flight-control commands to navigate the UAV from a current location within the target area to the target location within the target area, wherein the flight-control commands include one or more commands to cause the UAV to traverse the determined translational offset in hover mode; and causing the UAV to navigate, in hover mode, to the target location in accordance with the determined flight-control commands.

11. The method of claim 10, further comprising, in response to causing the UAV to navigate to the target location, using a retractable delivery system to lower a payload to ground level and release the payload at ground level, wherein the retractable delivery system comprises: (i) a delivery device configured to selectively secure the payload and release the payload, (ii) a tether coupled to the delivery device, and (iii) a retraction system configured to apply force on the tether while the delivery device is suspended from the UAV by the tether so as to alternately lower the delivery device from the UAV and retract the delivery device back to the UAV.

12. The method of claim 11, further comprising, prior to using the retractable delivery system to lower and release the payload at ground level: (i) sending, to the remote terminal, a third data communication comprising an indication that the UAV is hovering at the target location, and (ii) receiving, from the remote terminal, a fourth data communication comprising an authorization to initiate delivery.

13. The method of claim 11, further comprising:

receiving, from the remote terminal, a third data communication comprising authorization to retract the delivery device to the UAV; and in response to receiving the authorization to retract, using the retractable delivery system to initiate retraction of the delivery device to the UAV.

14. The method of claim 11, further comprising:

receiving, from the remote terminal, a third data communication comprising an indication of a position adjustment for the UAV so as to account for a wind-induced movement of the delivery device while the delivery device is suspended from the UAV by the tether; and causing the UAV to navigate, in hover mode, in accordance with the indicated position adjustment.

15. The method of claim 10, wherein the second data communication was generated by the remote terminal, wherein the indication of the target location was generated by the remote terminal based on the first data communication, and wherein the target location is indicated within the image data of the target area.

16. A method comprising:

displaying image data received from an image capture system situated on an unmanned aerial vehicle (UAV) while the UAV is located in a target area, wherein the displayed image data comprises at least a portion of the target area;

while displaying the image data, prompting a user for an input indicative of a target location within the target area;

displaying an indication of a delivery location preference associated with the target area;

subsequent to displaying the indication of the delivery location preference, receiving a user input indicative of the target location; and in response to receiving the user input, sending an indication of the target location to the UAV such that the UAV responsively navigates, in hover mode, from a current location within the target area to the target location within the target area.

17. The method of claim 16, further comprising:

determining a translational offset to the target location relative to the current location, wherein the translational offset is based on a first image coordinate associated with the received user input indicative of the target location, a second image coordinate associated with a point of view of the image capture system, and a current elevation of the UAV, and wherein sending the indication of the target location to the UAV comprises sending an indication of the determined translational offset.

\* \* \* \* \*